US012726693B2

(12) United States Patent
Chen et al.

(10) Patent No.: US 12,726,693 B2
(45) Date of Patent: Sep. 1, 2026

(54) OPTICAL IMAGING LENS

(71) Applicant: Genius Electronic Optical (Xiamen) Co., Ltd., Xiamen (CN)

(72) Inventors: Feng Chen, Xiamen (CN); Qingshu Ye, Xiamen (CN); Kai-Feng Lo, Xiamen (CN)

(73) Assignee: Genius Electronic Optical (Xiamen) Co., Ltd., Xiamen (CN)

( * ) Notice: Subject to any disclaimer, the term of this patent is extended or adjusted under 35 U.S.C. 154(b) by 32 days.

(21) Appl. No.: 19/025,568

(22) Filed: Jan. 16, 2025

(65) Prior Publication Data

US 2026/0089377 A1 Mar. 26, 2026

(30) Foreign Application Priority Data

Sep. 26, 2024 (CN) .......................... 202411351117.4

(51) Int. Cl.
*H04N 23/55* (2023.01)
*H04N 23/52* (2023.01)

(52) U.S. Cl.
CPC ............. *H04N 23/55* (2023.01); *H04N 23/52* (2023.01)

(58) Field of Classification Search
None
See application file for complete search history.

(56) References Cited

U.S. PATENT DOCUMENTS

2021/0294066 A1* 9/2021 Hirata .................... G02B 7/028
2024/0329353 A1* 10/2024 Nakajima .............. G02B 7/021
2024/0329355 A1* 10/2024 Kasahara ............... G02B 7/021
2024/0329356 A1* 10/2024 Hoshina ................. G02B 7/021
2024/0329357 A1* 10/2024 Nakajima ............. G02B 7/022
2025/0060616 A1* 2/2025 Ookubo ................. B23K 26/00

FOREIGN PATENT DOCUMENTS

CN 114706184 A * 7/2022 ............... G02B 7/00

OTHER PUBLICATIONS

Chang et al.; CN 114706184A; An Optical Imaging Lens; Jul. 5, 2022; pp. 1-7; English Translation (Year: 2022).*

* cited by examiner

*Primary Examiner* — Cynthia Calderon
(74) *Attorney, Agent, or Firm* — Chen Yoshimura LLP

(57) ABSTRACT

An optical imaging lens of the present invention comprises a light-shielding plate and two pieces of activated reactive bonding film positioned between two lens elements. The activated reactive bonding film are in a shape of ring. One of the pieces of activated reactive bonding film is positioned between an object-side surface of the light-shielding plate, facing an object side, and an image-side bearing surface of one of the two lens elements, corresponding to the mounting portion and facing an image side, and the other one is positioned between an image-side surface of the light-shielding plate, facing the image side, and an object-side bearing surface of the other one of the two lens elements, corresponding to the mounting portion and facing the object side. With respect to each of the pieces of activated reactive bonding film, the optical imaging lens may satisfy two inequalities.

11 Claims, 21 Drawing Sheets

OPTICAL IMAGING LENS

TECHNICAL FIELD

The present disclosure relates to an optical imaging lens, and particularly, to an optical imaging lens having a light-shielding plate.

BACKGROUND

Required screen-to-body ratio becomes greater and greater, whereas required sizes of optical imaging lens becomes smaller and smaller. However, if an image height and sizes of an image sensor are too small, imaging quality, such as resolution, will be deteriorated. Therefore, how to design an optical imaging lens with an acceptable image height, in addition to pursuing a light, thin and short lens is an object in the industry.

Currently, the way to decrease an outer diameter of an optical imaging lens is to reduce an outer diameter of a lens thereof by canceling a structure to wedge at a mounting portion of the lens. As such, a head portion of the optical imaging lens, i.e. the foremost one tenth portion of the optical imaging lens from an object side may be shrunk. Taking an optical imaging lens with 2.52 mm image height for example, the outer diameter may be shrunk from 3.52 mm to 2.6 mm.

Because the outer diameter of such a lens cannot be reduced anymore, shrinking sizes of a barrel is the next focus of research and development. Three major functions of a barrel are: 1. Positioning: Assembling lenses in the barrel to align with an optical axis precisely; 2. Protection: Avoiding from harm and pollution of dust; 3. Shielding and construction of aperture stop: Ensuring light passing through the whole system in the way of which is designed to avoid from light leakage and stray light. If no barrel is assembled in an optical imaging lens, considering a sidewall having an extremely thin thickness of a barrel falls within 0.2~0.25 mm, an outer diameter of such an optical imaging lens may be reduced by at least 0.4 mm, regardless of assembling, protection and shielding issues.

Current optical imaging lens without a barrel usually uses a technology of exposing the whole optical imaging lens to heat until a mounting portion of each lens melts and connects with each other. However, lenses may be decentered due to changing an air gap between the lenses during the heating process. Therefore, designing an optical imaging lens having a small head portion, providing assembling, protection and shielding functions and fixing the position of lens therein at the same time is a problem to be solved in the industry.

SUMMARY

The present invention provides an optical imaging lens for taking a photo or shooting a video, such as those in cell phones, digital cameras, tablet computers, in-vehicle cameras, personal digital assistants (PDA), and AR or VR wearable devices, may be assembled, positioned, protected and shaded through at least one light-shielding plate configured between a plurality of lens elements and two pieces of activated reactive bonding film positioned at an object-side surface and an image-side surface of the light-shielding plate. Preferably, an optical imaging lens of the present invention may provide good mechanisms of assembling, positioning, protection and shielding for the lens elements to reduce an outer diameter of a head portion of the optical imaging lens.

In the present disclosure, parameters used herein may be chosen from but not limited to the parameters listed below:

| Parameter | Definition |
|---|---|
| Wdsf | A maximum width of a piece of activated reactive bonding film in a radial direction. |
| TG | A thickness of a piece of activated reactive bonding film. |
| TGmax | A maximum thickness of a piece of activated reactive bonding film. |
| TGmin | A minimum thickness of a piece of activated reactive bonding film. |
| TGo | A thickness of a piece of low-temperature activated film. |
| Ws | A width of a light-shielding plate in a radial direction. |
| TS | A thickness of a light-shielding plate which is adjacent to a piece of low-temperature activated film. |
| Lms | A width of an image-side bearing surface or an object-side bearing surface which bears a light-shielding plate in a radial direction. |
| Has | A height of a protruding arc of a mounting portion of a lens element, relative to an object-side bearing surface or an image-side bearing surface of the lens element. |
| α | An included angle of two short sides of a protruding arc of a mounting portion of a lens element. |
| ODas | An outer diameter of a protruding arc of a mounting portion of a lens element. |
| IDas | An inner diameter of a protruding arc of a mounting portion of a lens element. |
| TBmax | A maximum thickness, along an optical axis, from an object-side full surface of a front lens element to an image-side full surface of the front lens element, which is received in a barrel, together with a spacer and a back lens element thereafter, in order from an object side to an image side. |
| TBmin | A minimum thickness, along an optical axis, from an object-side full surface of a back lens element to an image-side full surface of the back lens element, which is received in a barrel, together with a front lens element and a spacer ahead, in order from an object side to an image side. |
| DOB | A maximum distance, along an optical axis, from an image-side bearing surface of a mounting portion of a front lens element to an objects-side bearing surface of a mounting portion of a back lens element, which is received in a barrel, together with the front lens element and a spacer ahead, in order from an object side to an image side. |
| ODb | A maximum outer diameter of a base. |

-continued

| Parameter | Definition |
|---|---|
| ODh | A maximum outer diameter of a head portion of an optical imaging lens, in which the head portion is foremost one tenth of the optical imaging lens, starting from an object side. |
| ODm | A minimum outer diameter of a middle section of a sidewall of an optical imaging lens, in which the middle section of the sidewall is an outer sidewall from foremost four tenth to six tenth of the optical imaging lens, starting from an object side. |

An embodiment of the present invention provides an optical imaging lens, comprising a plurality of lens elements positioning from an object side to an image side along an optical axis, each of which comprises an object-side full surface facing the object side and an image-side full surface facing the image side and an optical portion and an mounting portion, formed in a radial direction, from center to edge. The object-side full surface comprises an objects-side bearing surface corresponding to the mounting portion. The image-side full surface comprises an image-side bearing surface corresponding to the mounting portion. A light-shielding plate and two pieces of activated reactive bonding film are positioned between two of the lens elements. The light-shielding plate comprises an object-side surface facing the object side and an image-side surface facing the image side. The two pieces of activated reactive bonding film are in a shape of ring. One of the two pieces of activated reactive bonding film is positioned between the object-side surface of the light-shielding plate and the image-side bearing surface of one of the two lens elements, and the other one of the two pieces of activated reactive bonding film is positioned between the image-side surface of the light-shielding plate and the object-side bearing surface of another one of the two lens elements. With respect to each of the two pieces of activated reactive bonding film, the optical imaging lens satisfies two inequalities: 0.05 mm≤Wdsf−Lms≤Ws−Lms and 0.1 mm≤Wdsf≤0.7 mm.

One embodiment of the optical imaging lens may further satisfy any one of inequalities as follows:

$$0.03\ \mu m \le TG \le 31\ \mu m;$$

$$4\ \mu m \le TG \le 31\ \mu m;$$

$$TGmax - TGmin \le 3\ \mu m;$$

$$TGmax - TGmin \le 2\ \mu m;$$

$$1.2 \le Has/(TGo + TS/2) \le 1.8;$$

$$45.6/(n\alpha)\ mm^2 \le \pi(ODas^2 - IDas^2) \le 572/(n\alpha)\ mm^2;$$

$$0.1\ mm \le Wdsf - Lms \le Ws - Lms - 0.1\ mm;$$

$$0.1\ mm \le Lms \le 1.2\ mm;$$

$$1.9 \le ODb/ODh \le 2.4;$$

$$1.2 \le ODm/ODh \le 1.7;$$

$$1.9 \le TBmax/TBmin \le 4.5;\ and/or$$

$$0.2\ mm \le DOB \le 1.0\ mm.$$

BRIEF DESCRIPTION OF THE DRAWINGS

Exemplary embodiments will be more readily understood from the following detailed description when read in conjunction with the appended drawing, in which.

DETAILED DESCRIPTION

For a more complete understanding of the present disclosure and its advantages, reference is now made to the following description taken in conjunction with the accompanying drawings, in which like reference numbers indicate like features. Persons of ordinary skill in the art having the benefit of the present disclosure will understand other variations for implementing embodiments within the scope of the present disclosure, including those specific examples described herein. The drawings are not limited to specific scale and similar reference numbers are used for representing similar elements. As used in the disclosures and the appended claims, the terms "example embodiment," "exemplary embodiment," and "present embodiment" do not necessarily refer to a single embodiment, although it may, and various example embodiments may be readily combined and interchanged, without departing from the scope or spirit of the present disclosure. Furthermore, the terminology as used herein is for the purpose of describing example embodiments only and is not intended to be a limitation of the disclosure. In this respect, as used herein, the term "in" may include "in" and "on", and the terms "a", "an" and "the" may include singular and plural references. Furthermore, as used herein, the term "by" may also mean "from", depending on the context. Furthermore, as used herein, the term "if" may also mean "when" or "upon", depending on the context. Furthermore, as used herein, the words "and/or" may refer to and encompass any and all possible combinations of one or more of the associated listed items.

In the present disclosure, an optical imaging lens may comprise a plurality of lens elements, from an object side to an image side along an optical axis, to receive imaging rays that are incident on the optical imaging lens over a set of angles ranging from parallel to the optical axis to a half field of view (HFOV) angle with respect to the optical axis. The lens elements is not limited to a certain number and shape.

Elements comprising at least a light-shielding plate and at least one piece of activated reactive bonding film are applied to an optical imaging lens of the present invention to facilitate construction mechanisms for assembling, positioning, protection and shielding; preferably, at least one portion of the optical imaging lens, such as a head portion, may be shrunk. The piece of activated reactive bonding film may be in a shape of ring, and preferably, twice of the light-shielding plate. In an implementation, to assemble the optical imaging lens, the light-shielding plate and the pieces of activated reactive bonding film may be pre-assembled to an assembly; however, they are not limited to this step, which may be omitted. To show that aforesaid mechanisms are well provided by the present invention, and preferably with a reduced head portion without a barrel, a plurality of embodiments are provided as follows.

Figure 1:
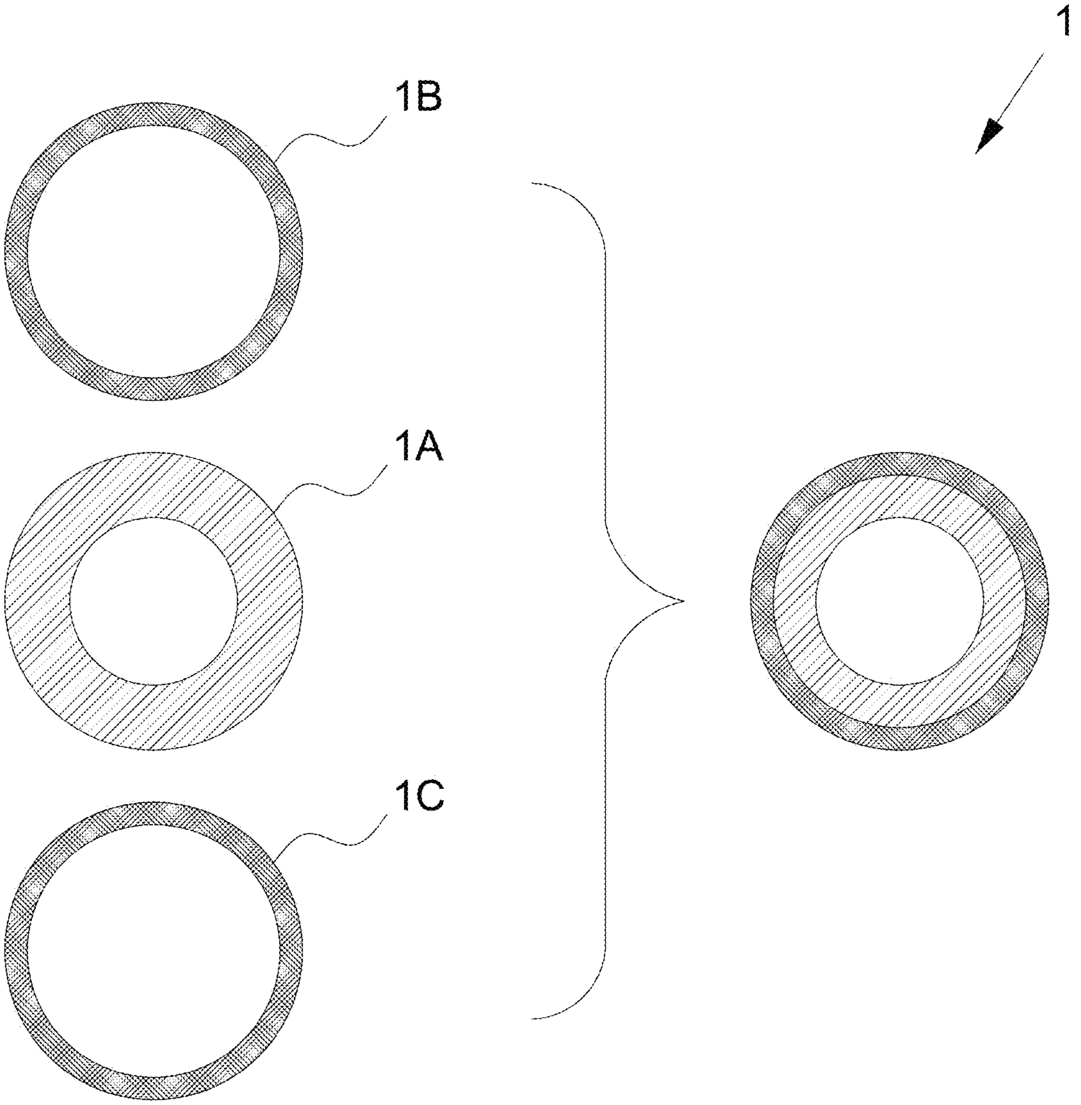
FIG. 1 depicts a top view of a light-shielding plate, two pieces of activated reactive bonding film and an assembly pre-assembled by the light-shielding plate and the two pieces of activated reactive bonding film according to a first embodiment of the present disclosure.
Figure 2:
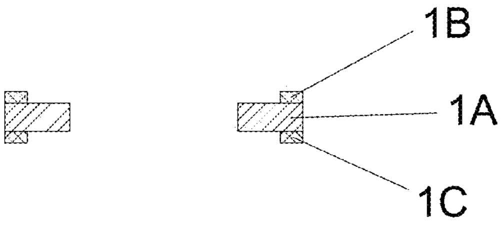
FIG. 2 depicts a cross-sectional view of the assembly pre-assembled by the light-shielding plate and the two pieces of activated reactive bonding film according to the first embodiment of the present disclosure.

At first, referring to FIGS. 1 and 2, in which FIG. 1 depicts a top view of a light-shielding plate, two pieces of activated reactive bonding film and an assembly pre-assembled by the light-shielding plate and the two pieces of activated reactive bonding film according to a first embodiment of the present disclosure, and FIG. 2 depicts a cross-sectional view of the assembly pre-assembled by the light-shielding plate and the two pieces of activated reactive bonding film according to the first embodiment of the present disclosure, the light-shielding plate may comprise an object-side surface facing the object side and an image-side surface facing the image side. Here, taking one single light-shielding plate corresponding to two pieces of activated reactive bonding film positioning between two optical elements of the optical imaging lens for example, these optical elements are called adjacent optical elements, which may be, but not limited to, two adjacent lens elements preferably. As shown in FIG. 1, an assembly 1 which is pre-assembled by the light-shielding plate and the pieces of activated reactive bonding film may be applied to the optical imaging lens of the present embodiment. The assembly 1 may comprise a piece of activated reactive bonding film 1B, a light-shielding plate 1A and another piece of activated reactive bonding film 1C. The two pieces of activated reactive bonding film 1B, 1C may be positioned on two surfaces, such as the object-side surface and the image-side surface of the light-shielding plate 1A respectively. The pre-assembling process may be performed with aligning the pieces of activated reactive bonding film 1B, 1C to the light-shielding plate 1A, setting up the pieces of activated reactive bonding film 1B, 1C and fixing them to the light-shielding plate 1A with their adhesion.

In the present embodiment, as shown in FIG. 2, the two pieces of activated reactive bonding film 1B, 1C and the light-shielding plate 1A are in a shape of concentric ring with the same outer diameter, but having different widths. As such, the activated reactive bonding film 1B, 1C and the light-shielding plate 1A have different inner diameters. The pieces of activated reactive bonding film 1B, 1C may be positioned within a predetermined range from the outer diameter of the light-shielding plate 1A for example. Preferably, the predetermined range, represented by a width in a radial direction, may be 0.1~0.7 mm, and more preferably, 0.2~0.7 mm. Material of the pieces of activated reactive bonding film 1B, 1C may have adhesion to a certain extent. Preferably, the adhesion may be increased with some adjustment, and more preferably, may be increased greatly to be capable to fix the pieces of activated reactive bonding film 1B, 1C on their location when the adhesion is activated with a predetermined means. Exemplary material of the pieces of activated reactive bonding film 1B, 1C may be a material having adhesion after being activated with a predetermined means. For example, the material may comprise, but not limited to: pressure sensitive adhesive (PSA), low-temperature activated film which comprising low-temperature reactive structural bonding film (LTR), low temperature cross-linkable structural bonding film (LTC) and the like. Preferably, the material may be adapted to provide good optical characteristics and thickness precision, and more preferably, suitable for assembling. The thickness precision may satisfy the requirement of no eccentric shift after the assembling is finished. The required optical characteristics depend on application of the optical imaging lens. Taking the PSA for example, its thickness may be about 5 μm, and its thickness precision may achieve below than 1 μm. The adhesion of the PSA may be activated by applying a pressure of 1~4 bar, and an intensity of adhesion may be varied by a pressure which is applied to a surface of the PSA directly. Taking the low-temperature activated film for example, its thickness may be chosen from 10 μm, 20 μm, 25 μm. The low-temperature activated film needs to be heated until about 75~110° C., in a pressure of 2~10 bar, for 10~480 seconds to be cured due to a cross-link reaction. Please note that a traditional double side tape, a thickness of which is about 30 μm cannot replace the pieces of activated reactive bonding film 1B, 1C, because it will cause an eccentric shift. There are three reasons: One, the thickness precision of the double side tape is poor, about +10%; two, the double side tape has high refection rate which is easy to cause stray light; and three, the double side tape may be sticked on an assembly machine during the assembly process.

Figure 3:
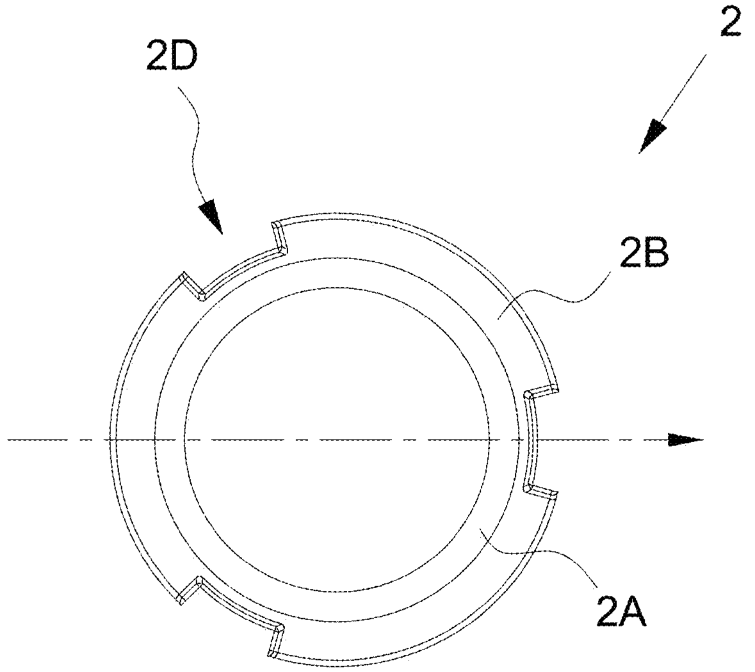
FIG. 3 depicts a top view of a light-shielding plate, two pieces of activated reactive bonding film and an assembly pre-assembled by the light-shielding plate and the two pieces of activated reactive bonding film according to a second embodiment of the present disclosure.
Figure 4:
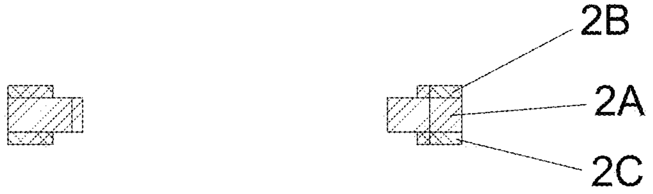
FIG. 4 depicts a cross-sectional view of the assembly pre-assembled by the light-shielding plate and the two pieces of activated reactive bonding film according to the second embodiment of the present disclosure.

FIGS. 3 and 4 are referred together, in which FIG. 3 depicts a top view of a light-shielding plate, two pieces of activated reactive bonding film and an assembly pre-assembled by the light-shielding plate and the two pieces of activated reactive bonding film according to a second embodiment of the present disclosure, and FIG. 4 depicts a cross-sectional view of the assembly pre-assembled by the light-shielding plate and the two pieces of activated reactive bonding film according to the second embodiment of the present disclosure. Here and in the embodiments hereinafter, for clearly showing the drawings of the present embodiment, only differences from the first embodiment may be illustrated. The pieces of activated reactive bonding film 2B, 2C of the present embodiment may be low-temperature activated films. In the assembly 2, which is shown in FIG. 3, all of an outer rim of a light-shielding plate 2A and an outer rim of two pieces of activated reactive bonding film 2B, 2C are formed with a corresponding opening and at least three recesses 2D. Here, three recesses 2D are shown for example. These recesses 2D have a curved edge and two short edges respectively. The curved edge is positioned between the short edges. With the recesses 2D, the light-shielding plate 2A, the pieces of activated reactive bonding film 2B, 2C may be positioned along with the adjacent optical elements in a more stable way. Details may be illustrated in the following paragraphs. During the pre-assembly process, the pieces of activated reactive bonding film 2B, 2C are aligned to the light-shielding plate 2A to overlap and position the recesses 2D, and then the pieces of activated reactive bonding film 2B, 2C are adhered to the light-shielding plate 2A fixedly.

Figure 5:
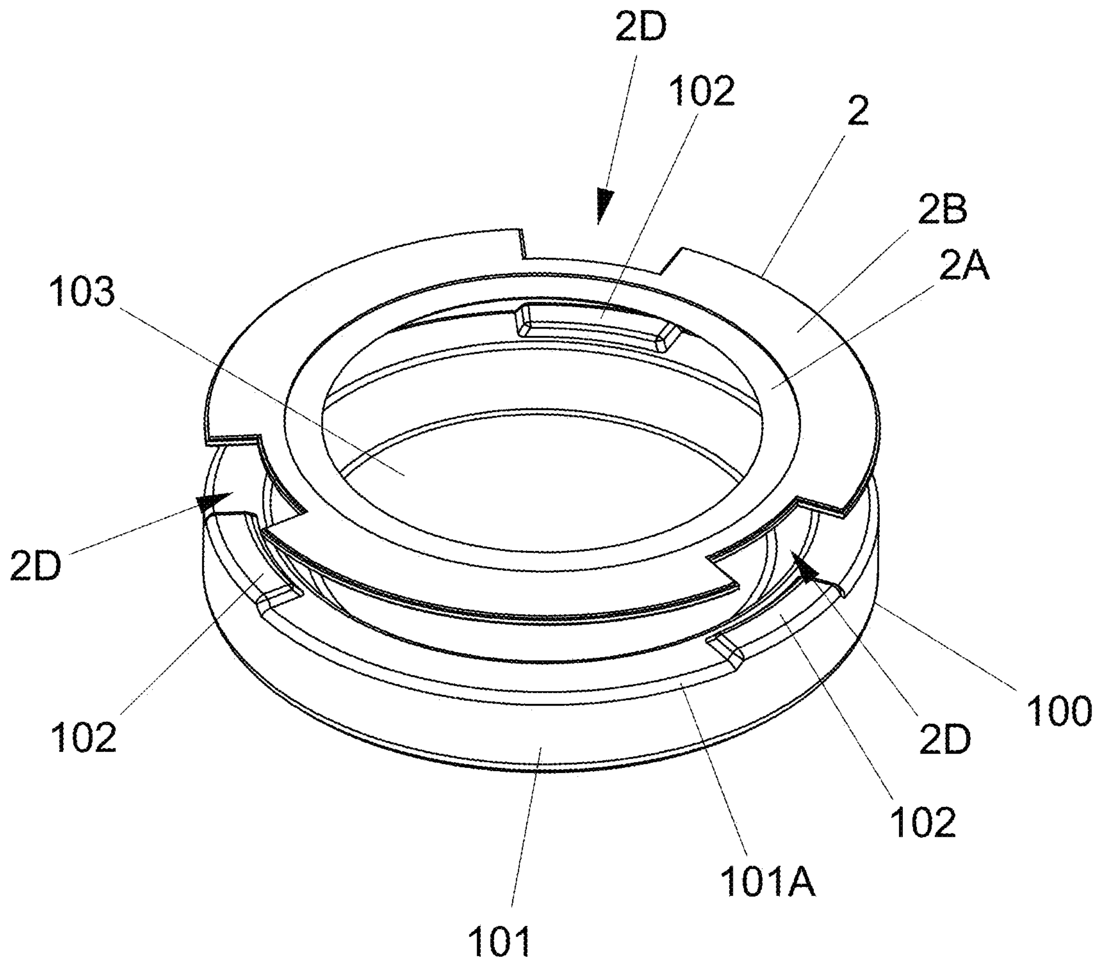
FIG. 5 depicts a perspective view of the assembly pre-assembled by the light-shielding plate and the two pieces of activated reactive bonding film and an exemplary adjacent optical element according to the second embodiment of the present disclosure.
Figure 6:
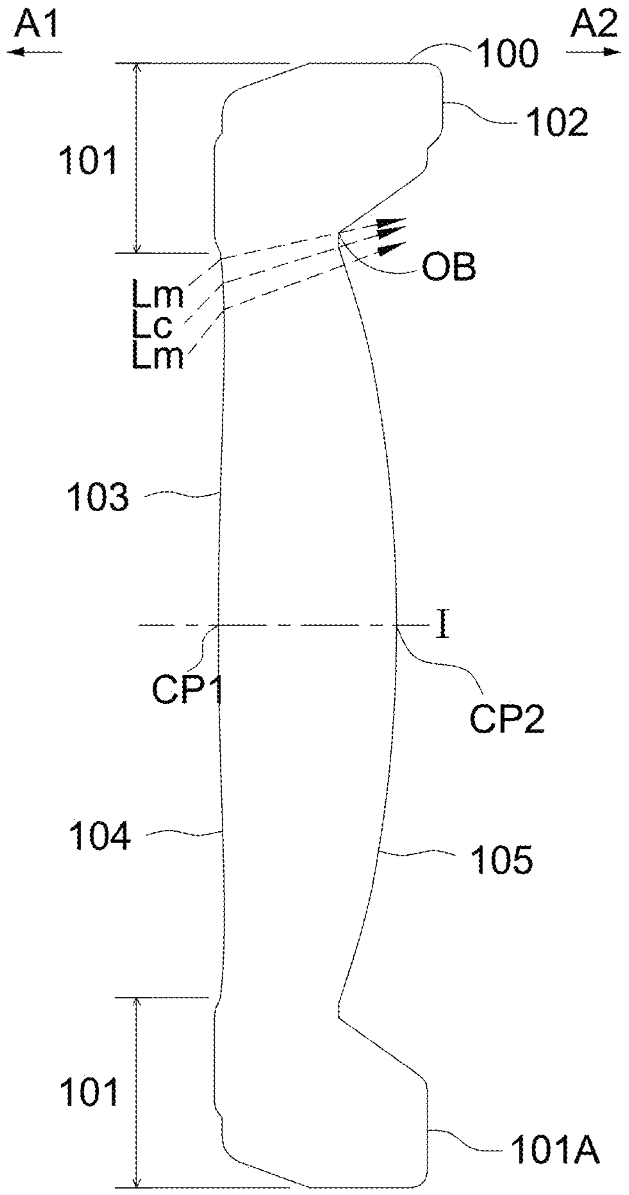
FIG. 6 depicts a cross-sectional view of the exemplary adjacent optical element according to the second embodiment of the present disclosure.
Figure 7:
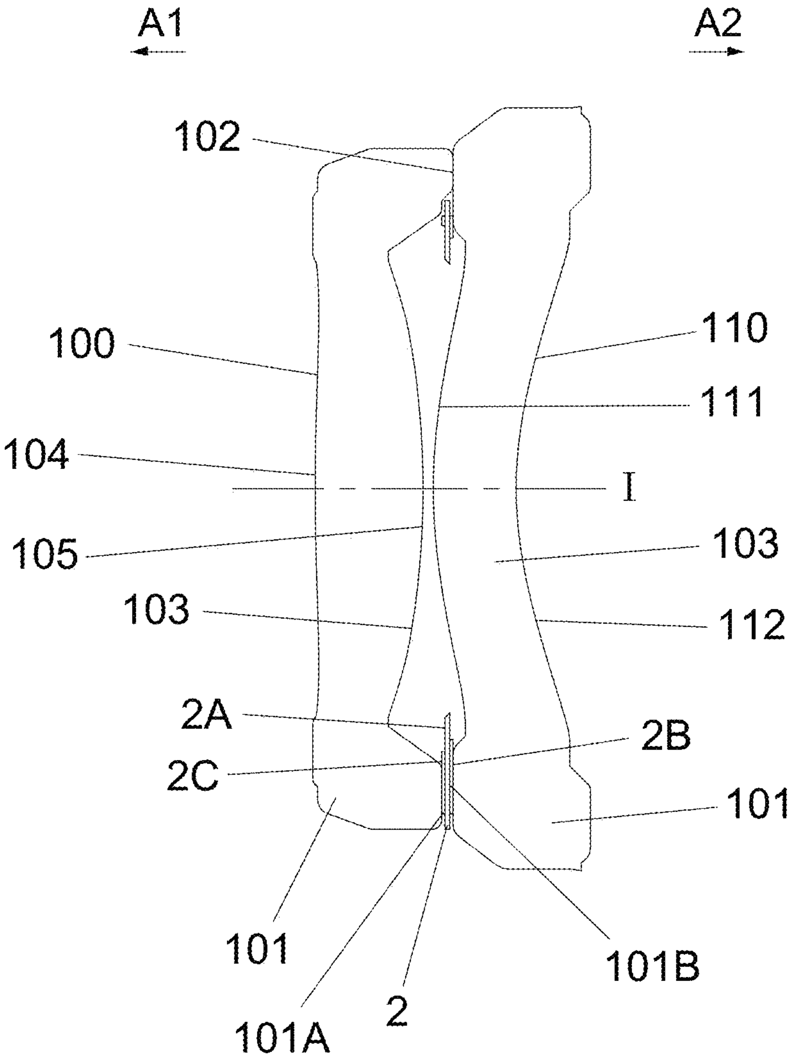
FIG. 7 depicts a cross-sectional view of two exemplary adjacent optical elements and the assembly pre-assembled by the light-shielding plate and the two pieces of activated reactive bonding film according to the second embodiment of the present disclosure.

FIGS. 5 to 7 are referred. Taking the assembly 2 of the second embodiment for example, positional relationship between a light-shielding plate, two pieces of activated reactive bonding film and an adjacent optical element is illustrated, in which FIG. 5 depicts a perspective view of the assembly pre-assembled by the light-shielding plate and the two pieces of activated reactive bonding film and an exemplary adjacent optical element according to the second embodiment of the present disclosure, FIG. 6 depicts a cross-sectional view of the exemplary adjacent optical element according to the second embodiment of the present disclosure, and FIG. 7 depicts a cross-sectional view of two exemplary adjacent optical elements and the assembly pre-assembled by the light-shielding plate and the two pieces of activated reactive bonding film according to the second embodiment of the present disclosure. As shown in FIG. 5, an adjacent optical element is a lens element, and here, may be, but not limited to, the lens element as shown in FIG. 6 for example. FIG. 6 is also referred for the details of the lens element. The adjacent lens element 100, formed with the optical portion 103 and the mounting portion 101 in a radial direction, from center to edge, may comprise the object-side full surface 104/the image-side full surface 105 facing the object side A1/the image side A2 respectively, as a surface of the lens element 100. A central point CP1/CP2 of the surfaces of the lens element 100 is a point of intersection of that surface and the optical axis I. For example, the central point CP1 is point of intersection of the object-side full surface 104 and the optical axis I, and the central point CP2 is point of intersection of the image-side full surface 105 and the optical axis I. The term "an optical portion of a lens element" refers to a specific region of that surface of the lens element 100 at which imaging rays can pass through that specific region. Imaging rays include at least two types of rays: a chief ray Lc and a marginal ray Lm. The term "a mounting portion of a lens element" refers to a specific region of the surface of the lens element 100 extending radially outward from an optical boundary OB, which corresponds to the portion of the lens element 100 other than the optical portion 103 approximately. As such, Imaging rays do not reach the mounting portion 101. The mounting portion 101 is typically used to physically secure the lens element to a corresponding element of the optical imaging lens, which will be explained in the following paragraphs. "An optical boundary OB of a surface of a lens element" is defined as a point at which the radially outermost marginal ray Lm passing through the surface of the lens element intersects the surface of the lens element. Structure and shape of the optical portion 103 are only an example, but not intended to limit the present invention. Various portions of the object-side full surface 104 (or the image-side full surface 105) of the lens element 100 may be defined. For example, the object-side full surface 104 may comprise an object-side bearing surface corresponding to the mounting portion 101 (not shown), and the image-side full surface 105 may comprise an image-side bearing surface 101A corresponding to the mounting portion 101. In another example of the adjacent lens element, referring to FIG. 7, among the object-side full surface 111 and the image-side full surface 112 of the lens element 110, only the object-side full surface 111 is formed with the object-side bearing surface 101B corresponding to the mounting portion 101. However, the lens element of the present invention is not limited to the specific example, and in some other example(s), both of the object-side bearing surface and the image-side bearing surface may exist.

Referring to FIG. 6, at least a side of the assembly 2, pre-assembled by a light-shielding plate 2A and two pieces of activated reactive bonding film 2B, 2C, such as the object side A1 or the image side A2, is fixedly positioned with the adjacent lens element 100, so as to attach the assembly 2 on either the image-side bearing surface 101A or the object-side bearing surface of the lens element 100, and here, taking the image-side bearing surface 101A for example. As shown in FIG. 5, the mounting portion 101 of the adjacent lens element 100 is formed with three protruding arcs 102, corresponding to each recesses 2D of the light-shielding plate 2A and the two pieces of activated reactive bonding film 2B, 2C. As such, when adhering the assembly 2 to the lens element 100, each of the protruding arcs 102 of the lens element 100 corresponds to a curved edge and two short edges of one of the recesses 2D, and preferably, they are against each other to increase stability of positioning the light-shielding plate 2A with the lens element 100, and more preferably, to form a concentrically position therebetween. Here, the exemplary adjacent lens element 110 may have, but not limited to, no protruding arcs 102.

Shape and sizes of the protruding arcs 102 are not limited, and here an example of a radial width of 0.08~0.15 mm and an arc length of 30 degrees is given, with the lens element 100 as reference.

When two adjacent lens elements exist, as shown in FIG. 7, both of the object side A1 and the image side A2 of the assembly 2, pre-assembled by the light-shielding plate 2A and the two pieces of activated reactive bonding film 2B, 2C, attach to an adjacent lens element 100/110, thereby the assembly 2, attaching to the image-side bearing surface 101A of the lens element 100 and the object-side bearing surface 101B of the lens element 110, is positioned therebetween. Specifically, one of the pieces of activated reactive bonding film 2B, 2C of the assembly 2, such as the piece of activated reactive bonding film 2C, is positioned between the object-side surface of the light-shielding plate 2A and the image-side bearing surface 101A of the one of the adjacent lens elements 100, 110 which is more close to the object side A1, i.e. the lens element 100, and the other piece of activated reactive bonding film 2B is positioned between the image-side surface of the light-shielding plate 2A and the object-side bearing surface 101B of another adjacent lens element 110. Briefly speaking, from the object side A1 to the image side A2, the adjacent lens element 100, the piece of activated reactive bonding film 2C, the light-shielding plate 2A, the other piece of activated reactive bonding film 2B and another adjacent lens element 110 are arranged in order. Through such arrangement, the light-shielding plate 2A may be positioned between the adjacent lens elements 100, 110 to shade unnecessary light, and the light-shielding plate 2A and the lens elements 100, 110 may be fixed through the pieces of activated reactive bonding film 2B, 2C to assemble, position and protect the lens elements 100, 110, and preferably, a certain predetermined means may be used to greatly increase adhesion of the pieces of activated reactive bonding film 2B, 2C, so as to fixedly adhere the pieces of activated reactive bonding film 2B, 2C to the position, as designed, to stably and concentrically position the light-shielding plate 2A and the lens elements 100, 110.

To fulfill the implementation of using the low-temperature activated film as the pieces of activated reactive bonding film 2B, 2C, at least a process, as follows, may be performed: 1) When positioning the assembly 2 or the pieces of activated reactive bonding film 2B, 2C on the first adjacent lens element 100, an additional heating process of pre-lamination may be performed to increase a bit of adhesion between the assembly 2 or the pieces of activated reactive bonding film 2B, 2C and the lens element 100, and the heating process may be performed with parameters comprise, but not limited to, a temperature within 50~60° C., a pressure within 1~5 Pa for a heating duration of 5~20 seconds; 2) Considering thickness contraction of the low-temperature activated film, caused by the pressure and heating during the pre-lamination, may be about 20~30%, preferably, compensation for the contraction may be provided when setting an original thickness of the low-temperature activated film, for example, making an overall original thickness of the assembly 2 thicker than a height of the protruding arcs 102 to compensate the contraction of the low-temperature activated films. Specifically, an excess of 20% of the height the protruding arcs 102 may be added to the overall original thickness of the assembly 2. Exemplary thickness of the low-temperature activated film may comprise 10 μm, 20 μm, 25 μm, etc. Taking 10 μm for example, the thickness of the light-shielding plate 2A may be chosen from 16 μm, 18 μm, 22 μm, 23 μm, 25 μm, etc., and taking 16 μm for example, the height of the protruding arcs 102 may be between 60% to 90% of the original thickness of the two low-temperature activated films and the two light-shielding plate 2A altogether, which is 36 μm.

In the embodiments in which a light-shielding plate and two pieces of activated reactive bonding film are not pre-assembled, a lens element, a plurality of pieces of activated reactive bonding film and a light-shielding plate may be positioned in order, as previously illustrated, to provide the mechanisms for assembling, positioning, protection and shielding the lens element, which are not repeated here.

Figure 17:
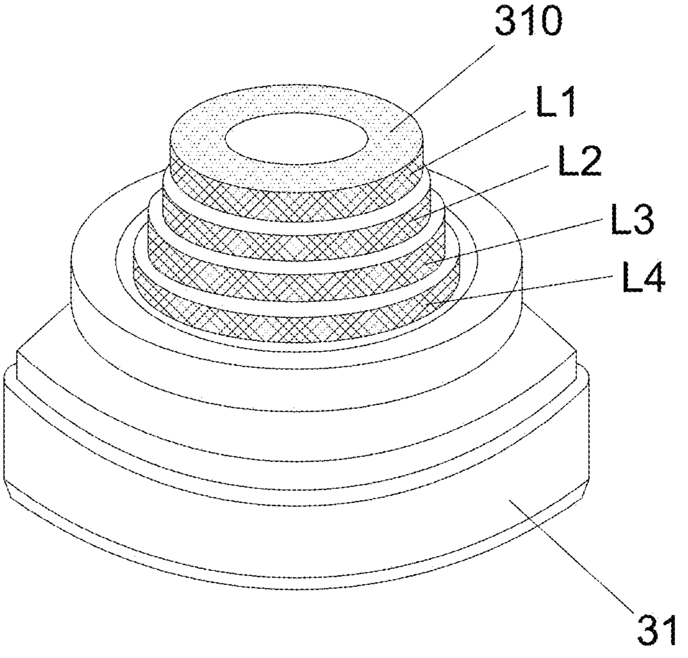
Figure 18:
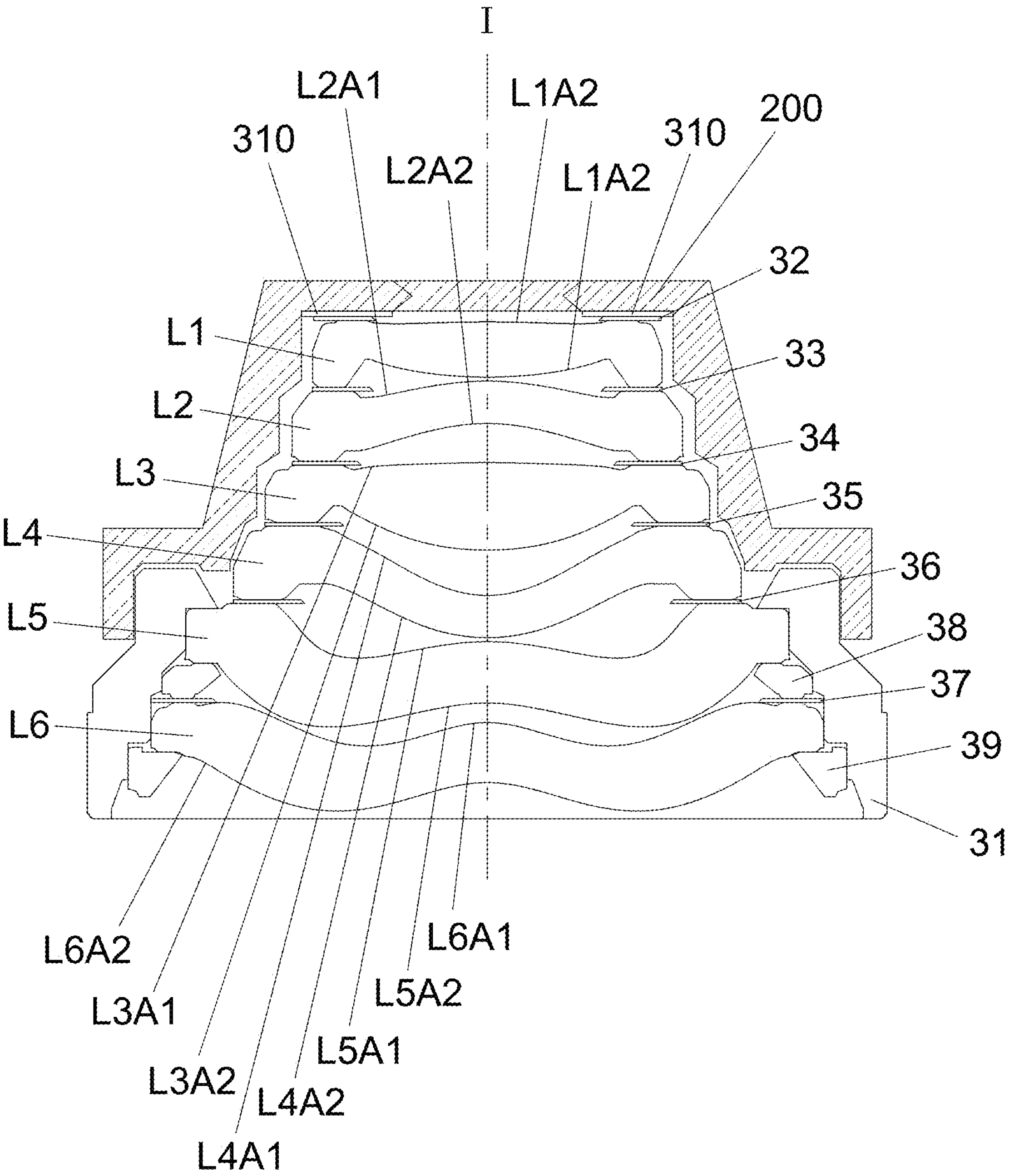
Figure 19:
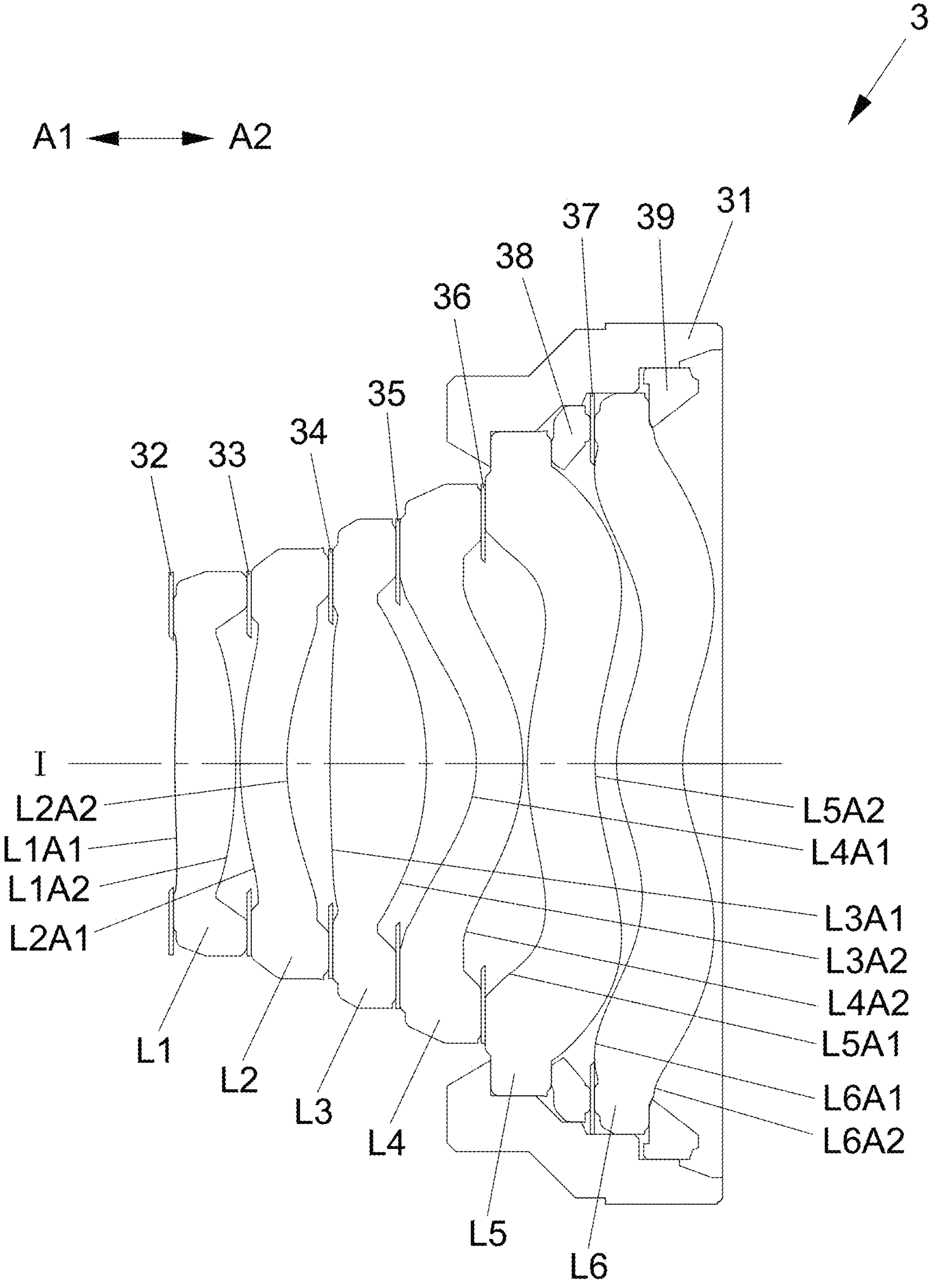
FIGS. 19~24 depict cross-sectional views of optical imaging lenses according to third to eighth embodiments of the present disclosure.
Figure 20:
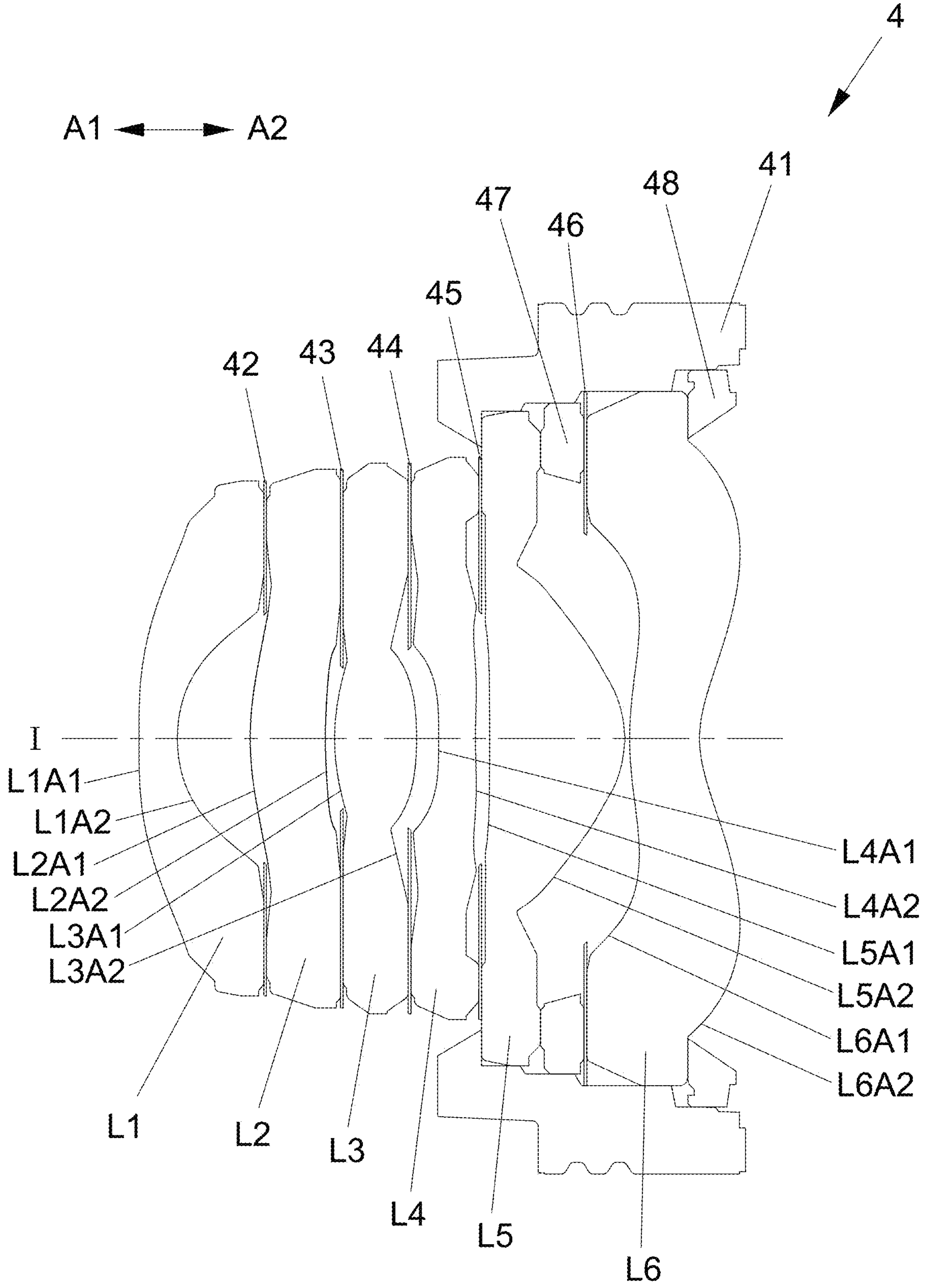
Figure 21:
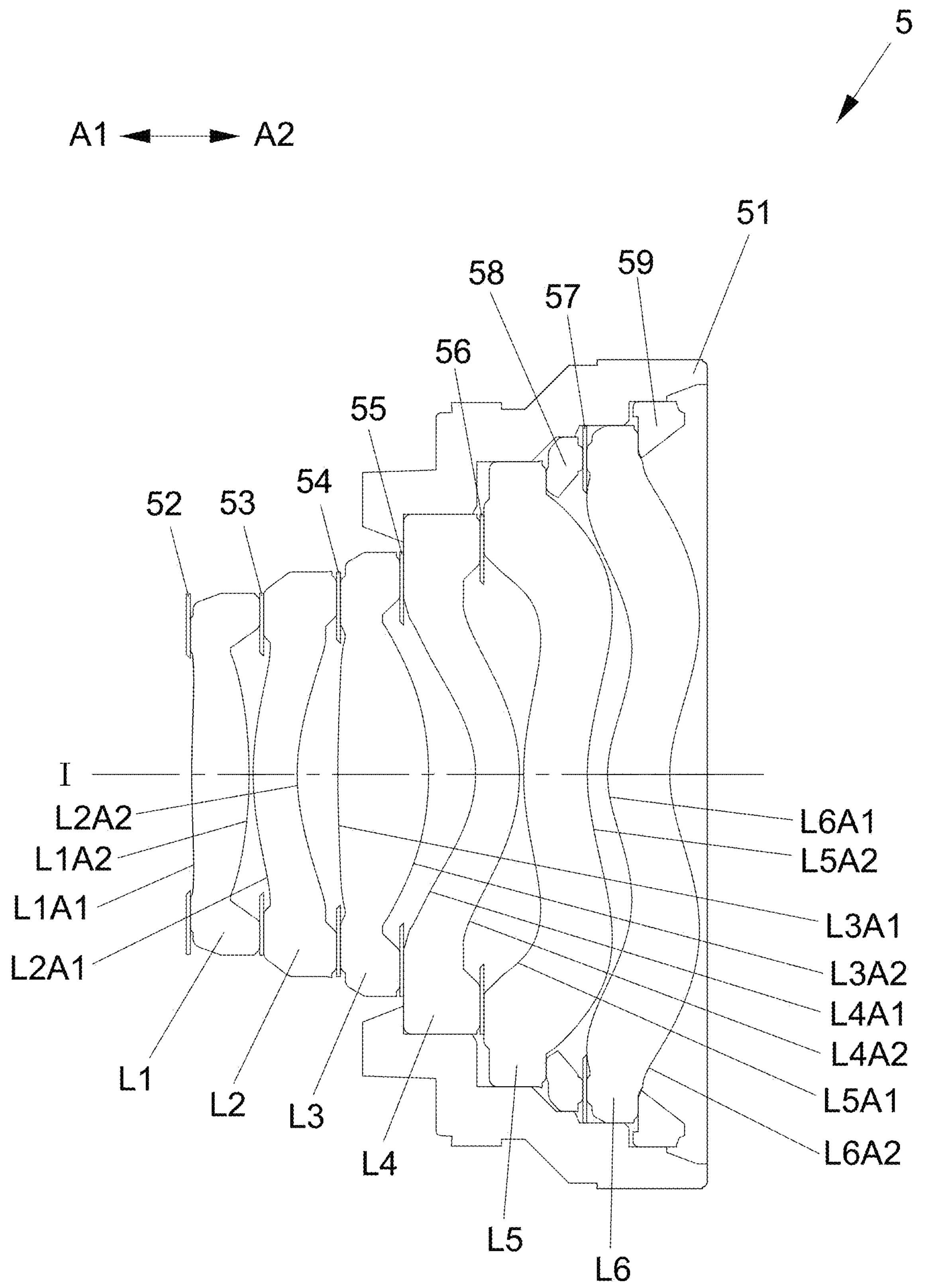
Figure 22:
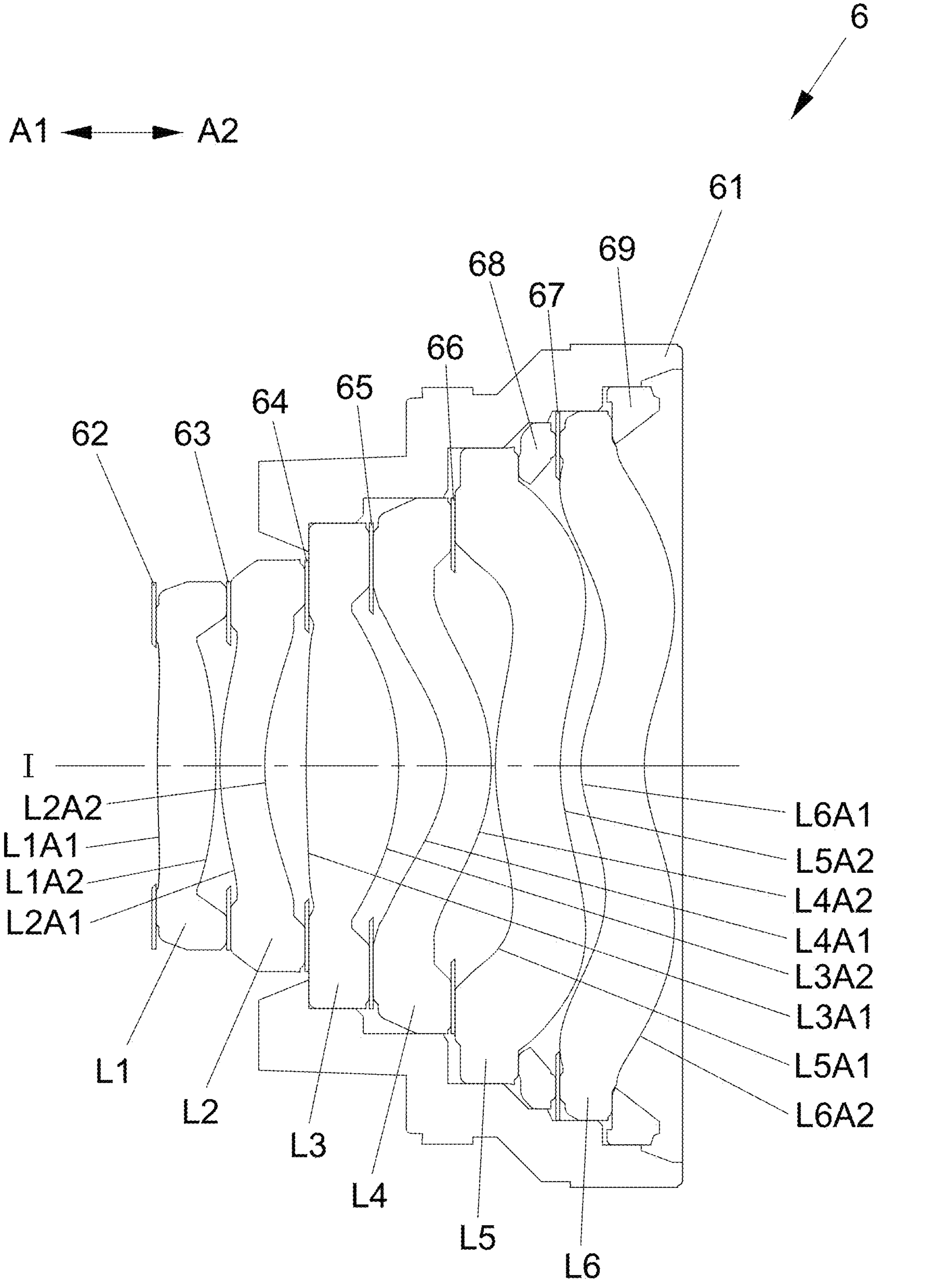
Figure 23:
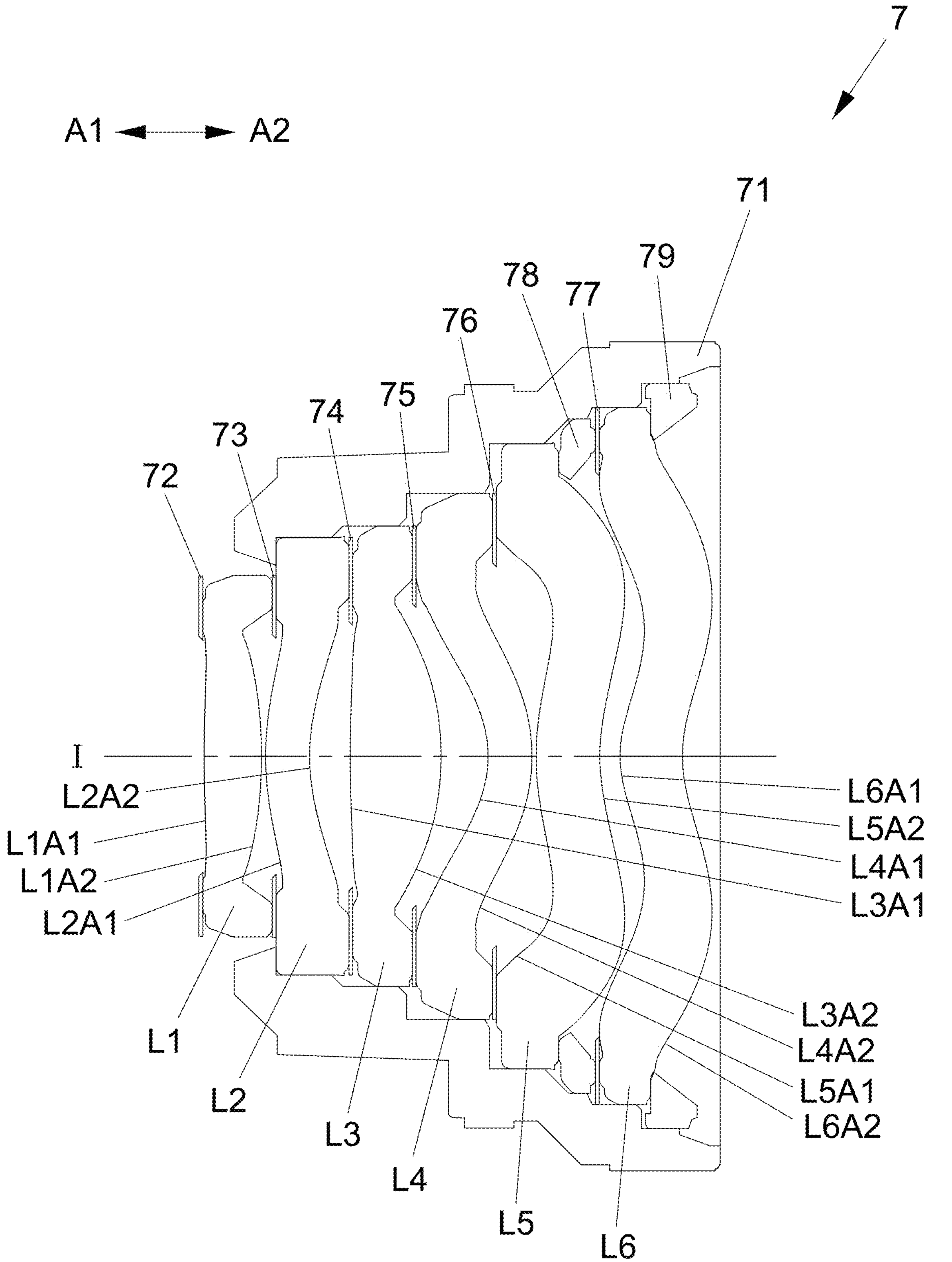
Figure 24:
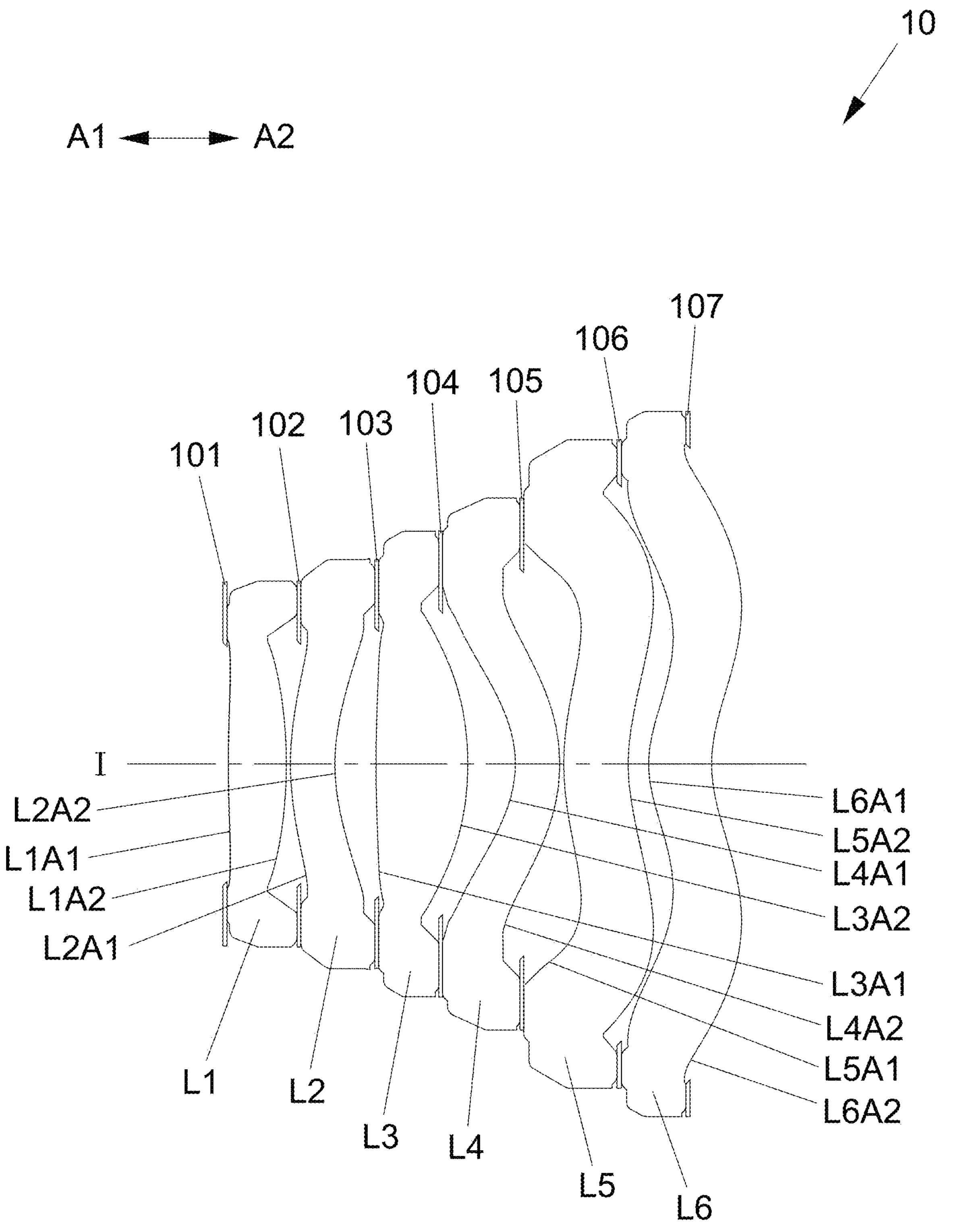

Referring FIGS. 8~19, in which FIGS. 8-18 depict cross-sectional views of exemplary structure of an optical imaging lens in each manufacturing process according to a third embodiment of the present disclosure, and FIG. 19 depicts cross-sectional views of optical imaging lenses according to a third embodiment of the present disclosure. Please note that, in the present embodiment, an assembly formed by pre-assembling a light-shielding plate and two pieces of activated reactive bonding film is used for example, which may be as shown in FIG. 1 or 3; however, a sole light-shielding plate may be used. As shown in FIG. 19, an exemplary optical imaging lens 3 may comprise, but not limited to, a first lens element L1, a second lens element L2, a third lens element L3, a fourth lens element LA, a fifth lens element L5 and a sixth lens element L6, arranged from the object side A1 to the image side A2.

Figure 8:
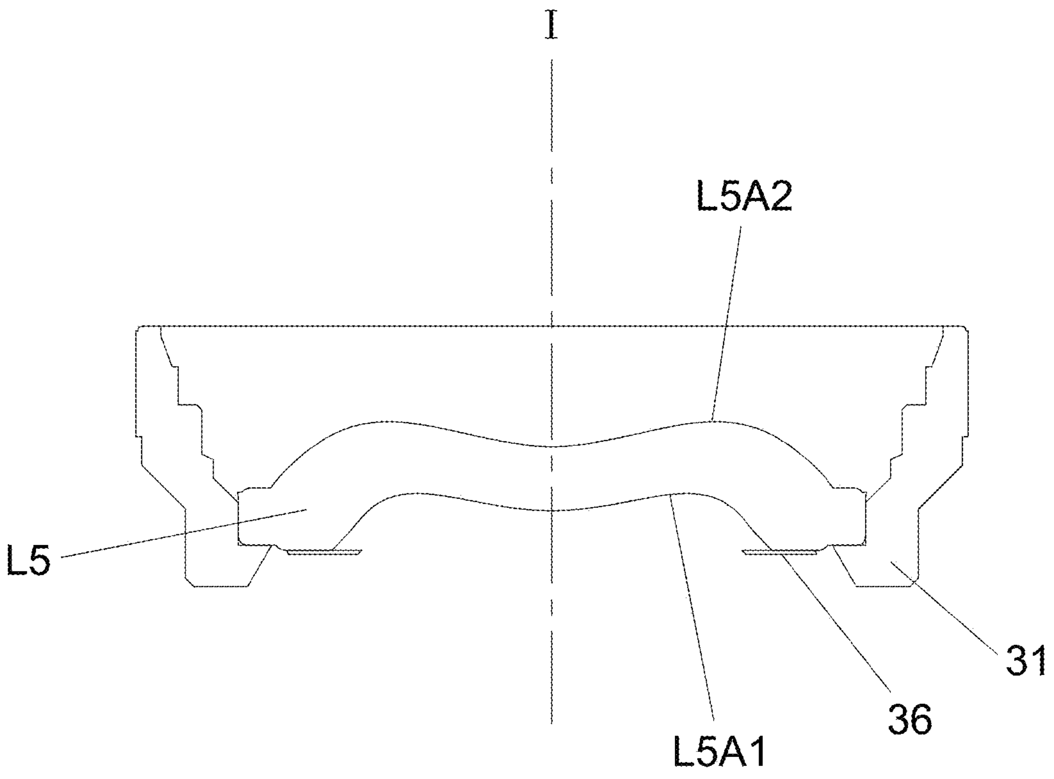
FIGS. 8~18 depict cross-sectional views of exemplary structure of an optical imaging lens in each manufacturing process according to a third embodiment of the present disclosure.
Figure 9:
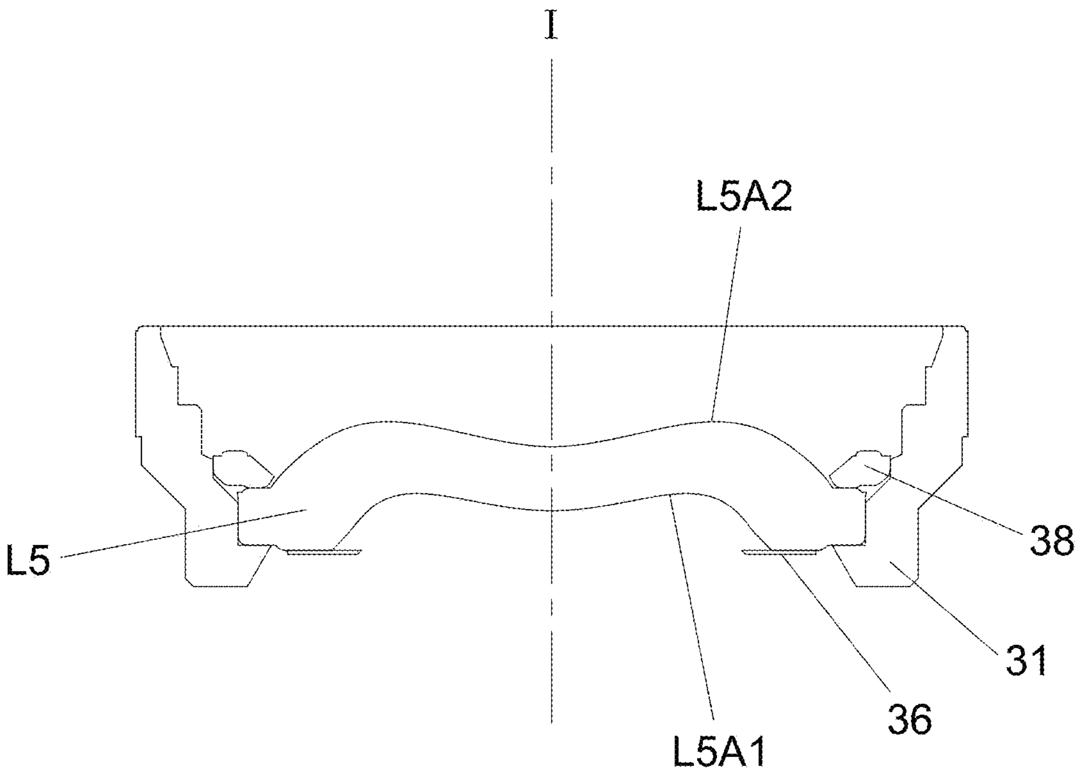
Figure 10:
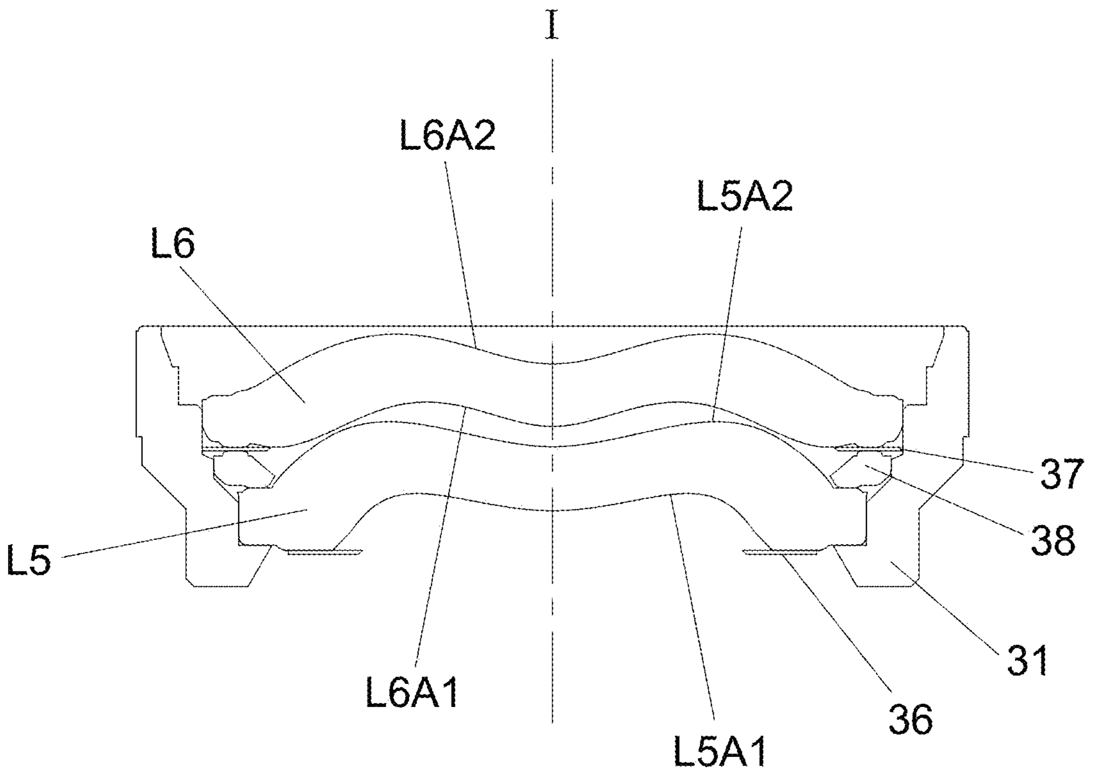
Figure 11:
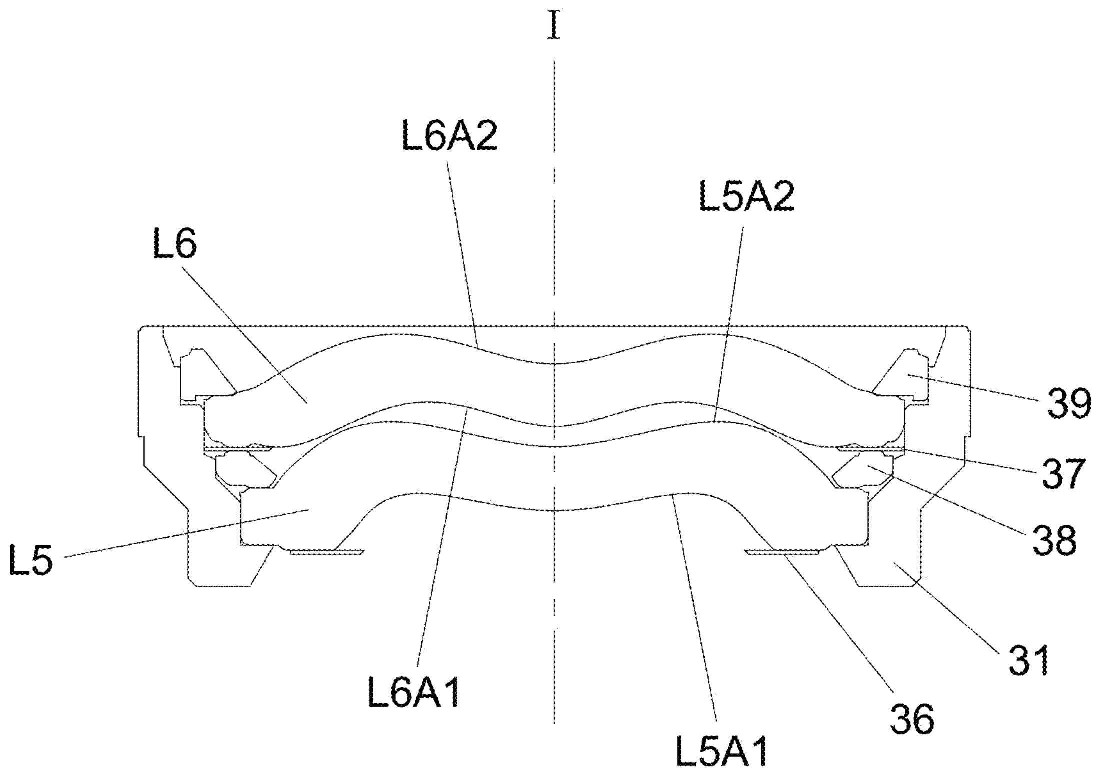

To manufacture the optical imaging lens 3, at first, several processes of assembling optical elements in a base may be performed. As shown in FIG. 8, an assembly 36, called a fifth assembly 36, is positioned at the object-side surface of the fifth lens element L5, and then, the fifth lens element L5 is received in a base 31. Preferably, the mounting portion of the fifth lens element L5 is at a fixed position against an inner rim of the base 31. In the present embodiment, the base 31 may be a barrel for example. Then, as shown in FIG. 9, a spacer 38 is positioned at the image side of the fifth lens element L5 to set a distance between the fifth lens element L5 and the sixth lens element L6. Then, as shown in FIG. 10, another assembly 37, called a sixth assembly 37, is positioned at the object-side surface of the sixth lens element L6, and then the sixth lens element L6 is received in the base 31 and attached to the spacer 38, so as to make the sixth assembly 37 at a fixed position against the spacer 38 and against another inner rim of the base 31, thereby eccentric shift of the lens element, caused by environmental factors, may be avoided. Further, the sixth assembly 37 may be constructed by another light-shielding plate without pieces of activated reactive bonding film. Then, as shown in FIG. 11, a retainer 39 to limit the position of the sixth lens element L6 may be positioned at the image side of the sixth lens element L6. At this time, from the object side A1 to the image side A2, the fifth lens element L5, as a front lens element, the spacer 38, the assembly 37, the sixth lens element L6 as a back lens element, and an retainer 39 are received in the base 31 in order. Then, the whole structure, including the base 31 and elements received therein is heated, such as baked with a baking apparatus to a predetermined temperature and/or subjected to a predetermined pressure for a predetermined duration. Heating parameters, such as the predetermined heating temperature, the predetermined pressure and the predetermined heating duration may depend on materials of the fifth assembly 36, the pieces of activated reactive bonding film of the sixth assembly 37, etc. in the base 31. For example, the parameters may be set to proper values so as to generate stable adhesion for the pieces of activated reactive bonding film. As mentioned previously, because the cross-link reaction of the low-temperature activated film may be significantly activated when heating to about at least 75° C., the predetermined heating temperature may be set to at least 75° C., such as 75~110° C., with a pressure of 5~10 Pa applied, for 10~480 seconds.

Figure 12:
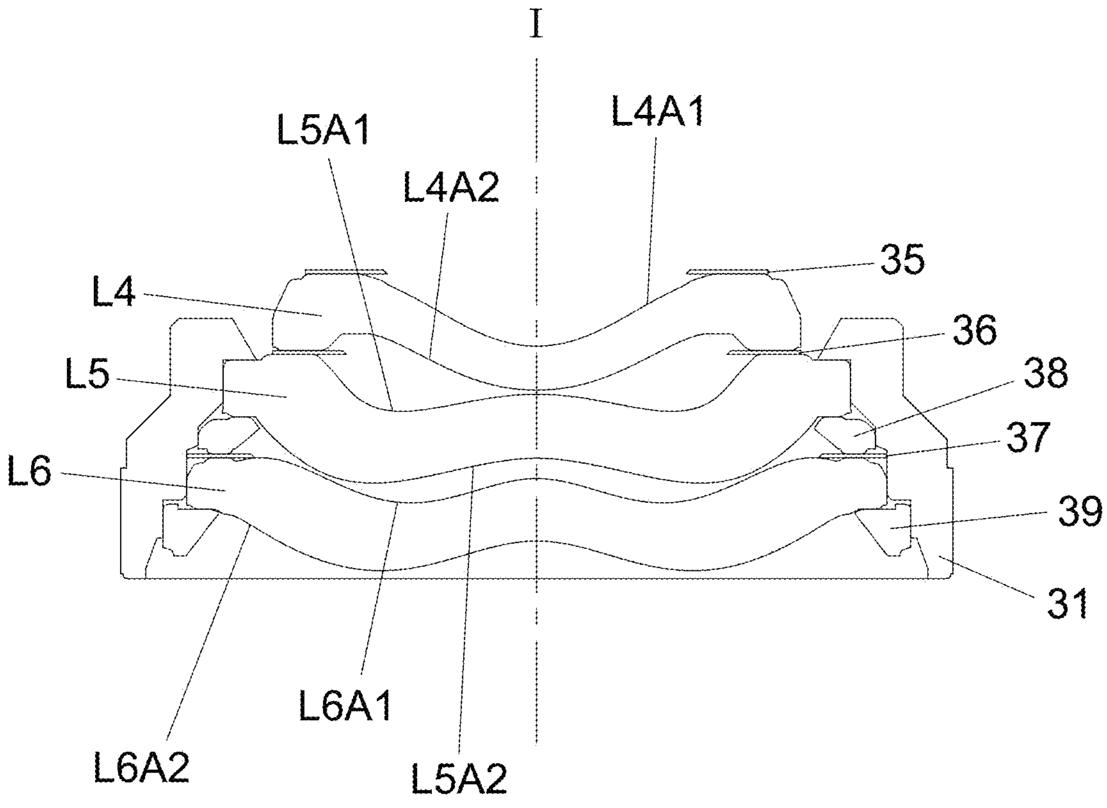
Figure 13:
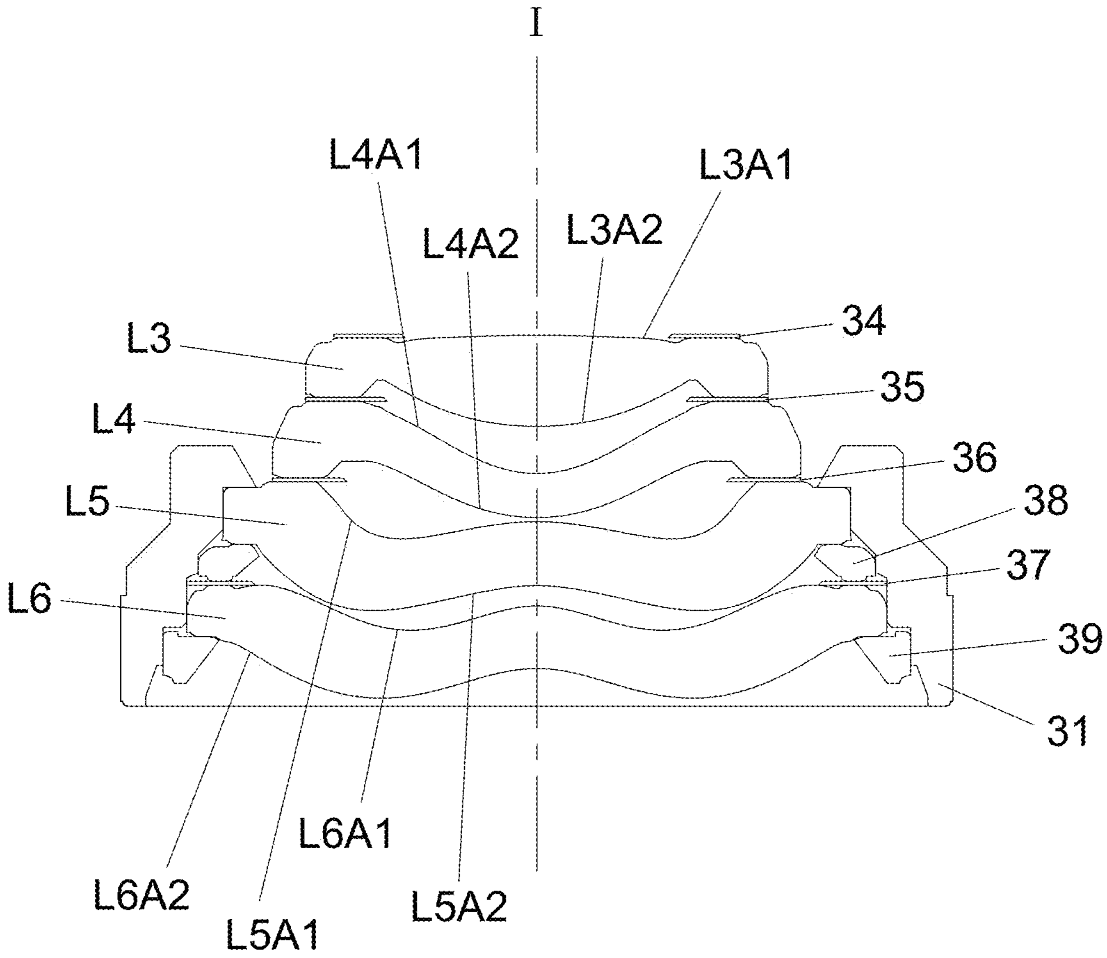
Figure 14:
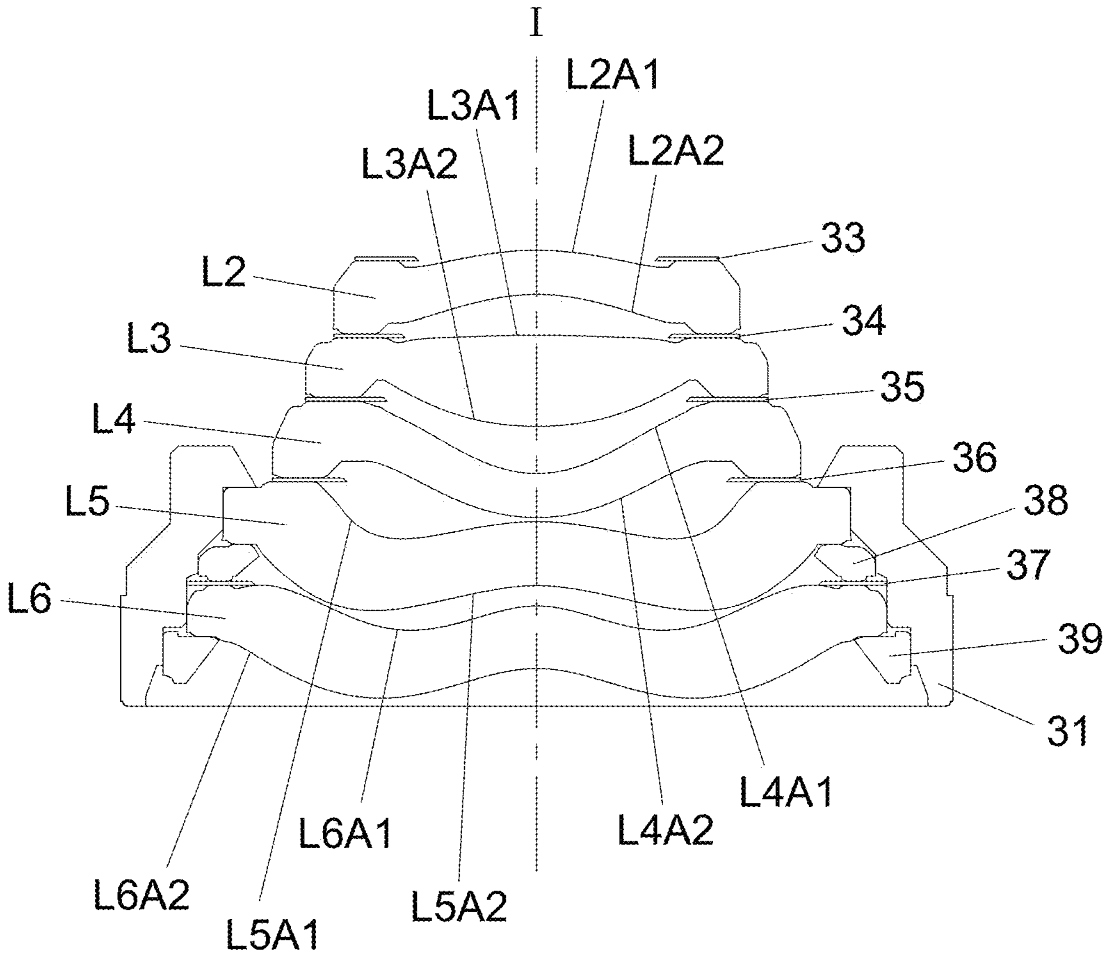
Figure 15:
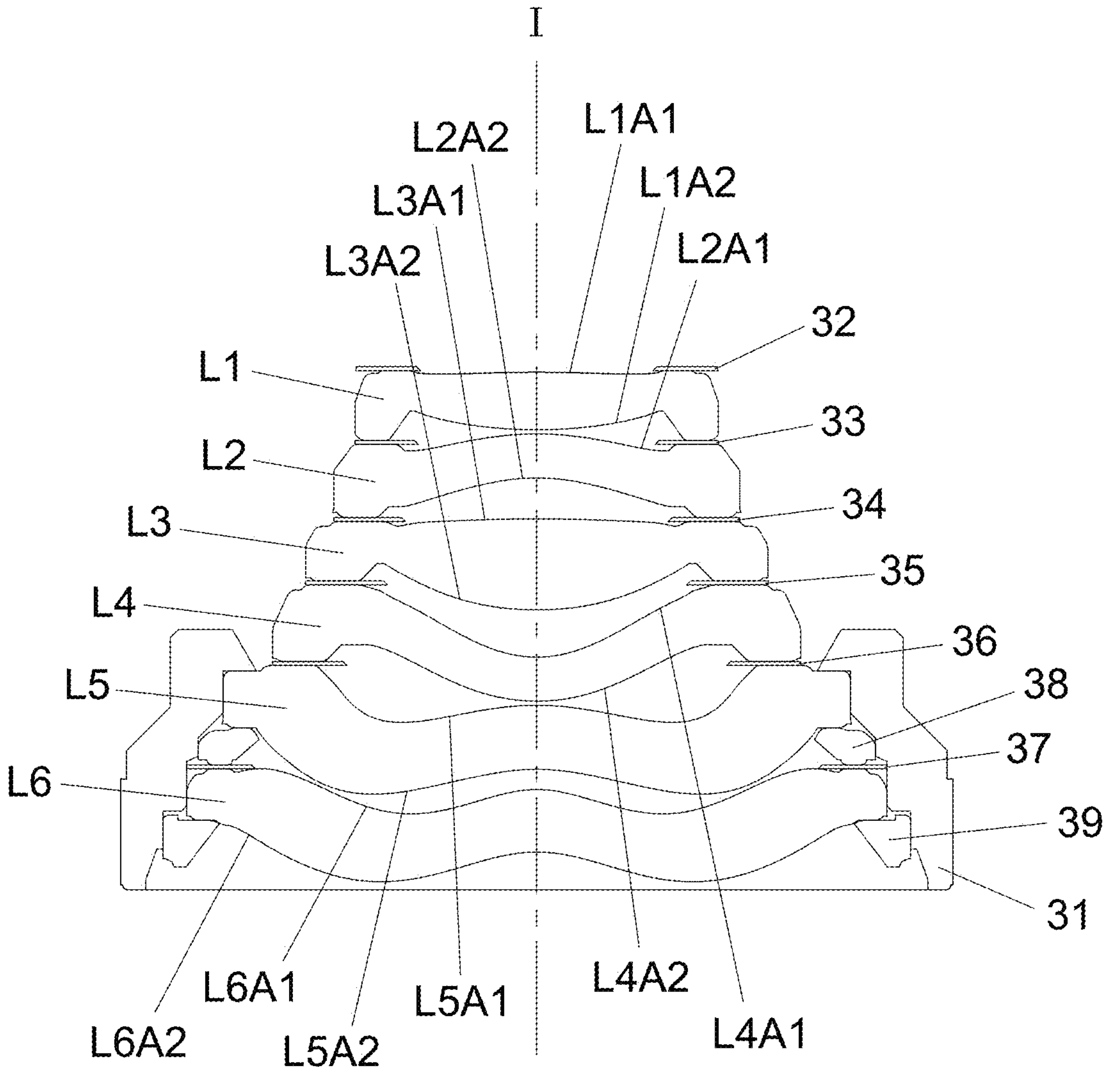

Afterwards, several processes of assembling optical elements outside the base 31 of the optical imaging lens 3 may be performed. As shown in FIGS. 12~15, starting from the object-side surface of the fifth lens element L5, the assembly including the light-shielding plate and the two pieces of activated reactive bonding film may be overlapped with the fourth lens element LA, the third lens element L3, the second lens element L2 and the first lens element L1 alternately, step by step, outside the base 31. Specifically, as shown in FIG. 12, a first step is to position the fourth lens element L4 on the object-side surface of the fifth lens element L5, so as to attach the fifth assembly 36 to both the fourth lens element L4 and the fifth lens element L5 therebetween. Another assembly 35, called a fourth assembly 35, is positioned on the object-side surface of the fourth lens element LA. Then, as shown in FIG. 13, the third lens element L3 is positioned on the object-side surface of the fourth lens element L4, so as to attach the fourth assembly 35 to both the third lens element L3 and the fourth lens element L4 therebetween. Then, yet another assembly 34, called a third assembly 34, is positioned on the object-side surface of the third lens element L3. Then, as shown in FIG. 14, the second lens element L2 is positioned on the object-side surface of the third lens element L3, so as to attach the third assembly 34 to both the second lens element L2 and the third lens element L3 therebetween. Then, yet another assembly 33, called a second assembly 33, is positioned on the object-side surface of the second lens element L2. Then, as shown in FIG. 15, the first lens element L1 is positioned on the object-side surface of the second lens element L2, so as to attach the second assembly 33 to both the first lens element L1 and the second lens element L2 therebetween. Then, yet another assembly 32, called a first assembly 32, is positioned on the object-side surface of the first lens element L1.

Figure 16:
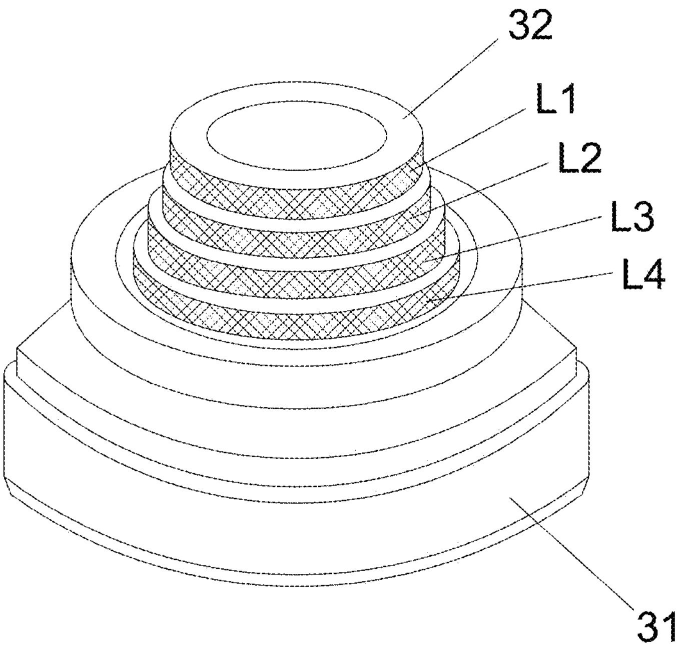

Then, at least one shielding process with respect to a sidewall of the optical elements received in the base 31 and the object-side surface of the first lens element L1 is performed. At first, as shown in FIG. 16, a sidewall of all of the optical elements which are not received in the base 31, comprising the first lens element L1, the second lens element L2, the third lens element L3 and the fourth lens element LA are blackened with a black ink. The sidewall may be a side surface connecting to the object-side surface and the image-side surface, and preferably, the whole sidewall is blackened to avoid from light leakage. Then, as shown in FIG. 17, an extra-black light-shielding plate 310 may be positioned outside the first assembly 32, which is at the object-side surface of the first lens element L1, and preferably, the extra-black light-shielding plate 310 may be metal light-shielding plate, to solve the problem of light leakage at a head portion of the optical imaging lens 3, and to provide a better appearance.

Then, as shown in FIG. 18, the whole structure as shown in FIG. 17 is put in a protective cover 200, and then is heated with such as a baking apparatus to fix the black pigment in the black ink on the first lens element L1, the second lens element L2, the third lens element L3 and the fourth lens element LA to form a blackened film which may be a layer of black pigment. Then, the optical imaging lens 3, as shown in FIG. 19, is finished. During transportation or conveyance, preferably, the optical imaging lens 3 may be received in and protected by the protective cover 200.

In other embodiments, aforesaid shielding process with respect to the sidewall of the optical elements received in the base 31 may be carried out through other means, such as laminating a black lamination, or coating a layer of black coating.

The optical imaging lens 3, finished through aforesaid processes, because the light-shielding plate for shielding and the pieces of activated reactive bonding film for fixing on a position are positioned between any two of the lens elements among the first lens element L1 to the sixth lens element L6, the good mechanisms for assembling, positioning, protection and shielding the lens element may be constructed, even though no barrel is provided to receive at least the first lens element L1, the second lens element L2, the third lens element L3 and the fourth lens element LA.

Besides, based on experiment data, an optical imaging lens which is assembled with the light-shielding plate and the pieces of activated reactive bonding film, shows a small outer diameter of the head portion which is reduced from 2.6 mm to 2.2 mm, in which 0~0.4 mm is reduced, and meanwhile, a distance from the object-side surface of the first lens element L1 to an imaging plane along the optical axis, i.e. a system length of the optical imaging lens, is reduced from 3.4 mm to 3.17 mm, in which 0~0.23 mm is reduced.

In an implementation in which pressure sensitive adhesive is used as at least one of the pieces of activated reactive bonding film, because the adhesion of the pressure sensitive adhesive may be activated by applying a pressure of 1~4 Pa, a process to apply a pressure to the corresponding piece of activated reactive bonding film or the assembly comprising the piece of activated reactive bonding film directly is required after positioning each of the pieces of activated reactive bonding film, comprising the pressure sensitive adhesive, or the assembly having the pressure sensitive adhesive as at least one of the pieces of activated reactive bonding film.

FIGS. 19~24 depict cross-sectional views of optical imaging lenses according to third to eighth embodiments of the present disclosure. Following Table 1, Table 2 shows setting values of parameters in optical imaging lenses of the third to eighth embodiments. Unit is mm. Definition of each parameter is provided in the previous paragraphs, and not repeated here.

TABLE 1

| Using pressure sensitive adhesive as the activated reactive bonding film | | | The seventh embodiment | The sixth embodiment | The fifth embodiment | The third embodiment |
|---|---|---|---|---|---|---|
| The first light-shielding plate | the object side | Wdsf | 0.1844 | 0.2344 | 0.1844 | 0.1844 |
| | | Lms(L1A2) | 0.1344 | 0.1344 | 0.1344 | 0.1344 |
| | | Ws | 0.3599 | 0.3599 | 0.3599 | 0.3599 |
| | the image side | Wdsf | 0.3829 | 0.3248 | 0.2748 | 0.2748 |
| | | Lms(L2A1) | 0.2402 | 0.2248 | 0.2248 | 0.2248 |
| | | Ws | 0.3829 | 0.3829 | 0.3829 | 0.3829 |
| The second light-shielding plate | the object side | Wdsf | | 0.3103 | 0.4103 | 0.4103 |
| | | Lms(L2A2) | | 0.1868 | 0.1868 | 0.1868 |
| | | Ws | | 0.4103 | 0.4103 | 0.4103 |
| | the image side | Wdsf | | 0.3333 | 0.4333 | 0.4333 |
| | | Lms(L3A1) | | 0.3287 | 0.2366 | 0.2984 |
| | | Ws | | 0.4333 | 0.4333 | 0.4333 |
| The third light-shielding plate | the object side | Wdsf | | | 0.2949 | 0.2949 |
| | | Lms(L3A2) | | | 0.1949 | 0.1949 |
| | | Ws | | | 0.4217 | 0.4717 |
| | the image side | Wdsf | | | 0.373 | 0.3976 |
| | | Lms(L4A1) | | | 0.273 | 0.2976 |
| | | Ws | | | 0.4447 | 0.4947 |
| The fourth light-shielding plate | the object side | Wdsf | | | | 0.325 |
| | | Lms(L4A2) | | | | 0.2349 |
| | | Ws | | | | 0.425 |
| | the image side | Wdsf | | | | 0.348 |
| | | Lms(L5A1) | | | | 0.2541 |
| | | Ws | | | | 0.448 |
| Parameters of the activated reactive | | TG | 10 | 20 | 30 | 5 |
| | | TGmax | 11 | 21.5 | 31 | 6 |

TABLE 1-continued

| Using pressure sensitive adhesive as the activated reactive bonding film | | The seventh embodiment | The sixth embodiment | The fifth embodiment | The third embodiment |
|---|---|---|---|---|---|
| bonding film | TGmin | 9 | 18.5 | 29 | 4 |
| Parameters of the optical imaging lens | ODb | 5.04 | 5.04 | 5.04 | 5.04 |
| | ODh | 2.2 | 2.2 | 2.2 | 2.2 |
| | TBmax | 0.6927 | 0.6927 | 0.6927 | 0.6927 |
| | TBmin | 0.3463 | 0.3463 | 0.3463 | 0.3463 |
| | DOB | 0.2663 | 0.2663 | 0.2663 | 0.2663 |
| | ODm | 3.7 | 3.7 | 3.7 | 3.2 |

TABLE 2

| Using low-temperature activated film as the activated reactive bonding film | | | The eighth embodiment | The fourth embodiment |
|---|---|---|---|---|
| The first lens element | The image side | Has | 21.6 | 67.5 |
| | | n | 3 | 3 |
| | | α | 30 | 30 |
| | | ODas | 2.0895 | 4.1369 |
| | | IDas | 2.0495 | 4.0169 |
| The first light-shielding plate | The object side | Wdsf | 0.2344 | 0.776 |
| | | Lms(L1A2) | 0.1344 | 0.676 |
| | | Ws | 0.3599 | 1.1377 |
| | The image side | Wdsf | 0.3248 | 0.4484 |
| | | Lms(L2A1) | 0.2248 | 0.3484 |
| | | Ws | 0.3829 | 1.1152 |
| Parameters of the activated reactive bonding film | | TGo | 10 | 25 |
| | | TG | 2.8 | 21.25 |
| | | TGmax | 3.8 | 22.25 |
| | | TGmin | 1.8 | 20.25 |
| The second lens element | the image side | Has | 25.2 | 60 |
| | | n | 4 | 4 |
| | | α | 25 | 45 |
| | | ODas | 2.3259 | 4.3789 |
| | | IDas | 2.16 | 4.27 |
| The second light-shielding plate | the object side | Wdsf | 0.3103 | 1.5698 |
| | | Lms(L1A2) | 0.1868 | 1.0295 |
| | | Ws | 0.4103 | 1.6698 |
| | the image side | Wdsf | 0.3333 | 1.5927 |
| | | Lms(L2A1) | 0.2984 | 1.116 |
| | | Ws | 0.4333 | 1.6927 |
| Parameters of the activated reactive bonding film | | TGo | 10 | 25 |
| | | TS | 16 | 25 |
| | | TG | 4.6 | 17.5 |
| | | TGmax | 5.6 | 18.5 |
| | | TGmin | 3.6 | 16.5 |
| Parameters of the optical imaging lens | | ODb | 5.04 | 7.36 |
| | | ODh | 2.2 | 3.6391 |
| | | TBmax | | 1.1497 |
| | | TBmin | | 0.2721 |
| | | DOB | 0.2663 | 0.6384 |
| | | ODm | 3.2 | 4.5481 |

In an embodiment, with respect to each of the pieces of activated reactive bonding film, an optical imaging lens may optionally satisfies at least one of the following inequalities:

$$0.05\ \text{mm} \le Wdsf - Lms \le Ws - Lms; \quad \text{Inequality (1)}$$

$$0.1\ \text{mm} \le Wdsf \le 0.7\ \text{mm}; \quad \text{Inequality (2)}$$

$$0.03\ \mu\text{m} \le TG \le 31\ \mu\text{m}; \quad \text{Inequality (3)}$$

$$TGmax - TGmin \le 3\ \mu\text{m}; \quad \text{Inequality (4)}$$

$$4\ \mu\text{m} \le TG \le 31\ \mu\text{m}; \quad \text{Inequality (5)}$$

$$TGmax - TGmin \le 2\ \mu\text{m}; \quad \text{Inequality (6)}$$

$$1.2 \le Has/(TGo + TS/2) \le 1.8; \quad \text{Inequality (7)}$$

$$45.6/n\alpha\ \text{mm}^2 \le \pi(ODas^2 - IDas^2) \le 572/n\alpha\ \text{mm}^2; \quad \text{Inequality (8)}$$

-continued $$0.1\ \text{mm} \le WDsf - Lms \le Ws - Lms - 0.1\ \text{mm}; \quad \text{Inequality (9)}$$

$$0.1\ \text{mm} \le Lms \le 1.2\ \text{mm}; \quad \text{Inequality (10)}$$

$$1.9 \le ODb/ODh \le 2.4; \quad \text{Inequality (11)}$$

$$1.9 \le TBmax/TBmin \le 4.5; \quad \text{Inequality (12)}$$

$$0.2\ \text{mm} \le DOB \le 1.0\ \text{mm}; \quad \text{Inequality (13)}$$

$$1.2 \le ODm/ODh \le 1.7. \quad \text{Inequality (14)}$$

When an optical imaging lens satisfies Inequalities (1) and (2) at the same time, this will benefit to fixing the position of the adjacent lens element(s) and the light-shielding plate with the pieces of activated reactive bonding film, avoiding from an offset for the adjacent lens element(s) due to various factor, and assembling the lens element(s) and the light-shielding plate without a barrel. As such, a space for a thick sidewall of the optical imaging lens may be saved, and the outer diameter of the head portion of the optical imaging lens may be shrunk. An assembling tolerance of the light-shielding plate and the pieces of activated reactive bonding film may be about 0.05 mm, a reflection of the pieces of activated reactive bonding film may be about 4~8%. If the inner rim of the pieces of activated reactive bonding film exceeds the inner rim of the light-shielding plate, severe stray light will be generated in the optical imaging lens. To promote stability of adhesion in the process of assembling the light-shielding plate and the lens element, the assembling tolerance of 0.05 mm is given when designing the acceptable range of Wdsf–Lms. When Wdsf–Lms is smaller than or equal to Ws–Lms, the inner rim of the pieces of activated reactive bonding film may not exceed the inner rim of the light-shielding plate to reduce possibility of stray light.

A thickness of an ordinary tape sold on the market is about 30 μm, with a precision of ±10%. In other words, maximum difference of thickness for the tape is about 6 μm. When an optical imaging lens satisfies Inequalities (3), (4), it may be beneficial to shorten a length of the head portion of the optical imaging lens, and avoid from generating an eccentric shift, which deteriorates the imaging quality, during assembling of the lens elements of the optical imaging lens due to the maximum difference of thickness of the adhesion.

When an optical imaging lens satisfies Inequalities (5), (6), it may be beneficial to choose pressure-resistant pressure sensitive adhesive as the pieces of activated reactive bonding film, without effecting an air gap between the adjacent lens elements, and reduce possibility of eccentric shift in the assembling processes. Because the pressure sensitive adhesive has adhesion, after some surface processing step(s), such as the one with Teflon, the pressure sensitive adhesive sticking on a nozzle of an assembling apparatus, which is harmful for a yield of assembling the pressure sensitive adhesive, may be avoided.

When optical imaging lens satisfies Inequality (7), it may be beneficial to design proper protruding arcs defining an air gap between the adjacent lens elements under the premise that 10%~40% thickness of the low-temperature activated film is compressed, and preferably, the optical imaging lens satisfies 1.4≤Has/(TGo+TS/2)≤1.6, which may facilitate designing protruding arcs defining an air gap between the adjacent lens elements under the premise that 20%~30% thickness of the low-temperature activated film is compressed.

When an optical imaging lens satisfies Inequality (8), it may be beneficial to design a proper area for the protruding arcs, which is sufficient to assemble the optical imaging lens under a yield strength of 62 mpa and a pressure of assembly of 0.2~2.5 kg, and preferably, the optical imaging lens may satisfy 227/(na) $mm^2 \le \pi(ODas^2 - IDas^2) \le 572/(n\alpha)$ $mm^2$, which is sufficient to assemble the optical imaging lens under a yield strength of 62 mpa and a pressure of assembly of 1~2.5 kg.

When an optical imaging lens satisfies Inequality (9), the designed value of Wdsf−Lms may be reserved for an assembling tolerance of 0.1 mm, and this may assist in promoting the assembling yield of the pieces of activated reactive bonding film and the light-shielding plate. Further, when designing a ring shape area having 0.1 mm width, reserved from the inner diameter of the light-shielding plate, it may be benefit to cover stray light close to a light passing hole of the light-shielding plate, such as within 0.1 mm from the light passing hole. When satisfying aforesaid conditions, along with Inequality (10), it may be beneficial to design a proper area to adhere the corresponding object-side/the image-side bearing surfaces of the pieces of activated reactive bonding film and the adjacent lens element to reduce the chance of shifting due to the adjacent lens element. Preferably, the optical imaging lens satisfies 0.1 mm≤Lms≤0.3 mm, so as to assist in shrinking sizes of the adjacent lens element to shorten the outer rim of the optical imaging lens.

When an optical imaging lens satisfies Inequality (11), it may be beneficial to reduce a maximum outer diameter of the head portion of the optical imaging lens to less than 45% of ODb.

When an optical imaging lens satisfies Inequality (12), (13), it may be beneficial to reduce the maximum diameter of the head portion, and meanwhile, assemble the last two lens elements, the OB of which are different to a greater extent, with a spacer to avoid from damaging manufacturing yield of the lens elements due to a great wall thickness ratio. Further, in such an optical imaging lens, to an image sensor may be connected to easily, measurement of various imaging quality may be performed conveniently, and the lens element may be protected properly.

When an optical imaging lens satisfies Inequality (14), it may be beneficial to make a length of a portion of the optical imaging lens formed by the lens element(s) which is not received in a barrel, along the optical axis, greater than 1.5 mm.

The contents in the embodiments of the invention include but are not limited to a focal length, a thickness of a lens element, an Abbe number, or other optical parameters. For example, in the embodiments of the invention, an optical parameter A and an optical parameter B are disclosed, wherein the ranges of the optical parameters, comparative relation between the optical parameters, and the range of a conditional expression covered by a plurality of embodiments are specifically explained as follows:

(1) The ranges of the optical parameters are, for example, $\alpha_2 \le A \le \alpha_1$ or $\beta_2 \le \beta \le \beta_1$, where $\alpha_1$ is a maximum value of the optical parameter A among the plurality of embodiments, $\alpha_2$ is a minimum value of the optical parameter A among the plurality of embodiments, $\beta_1$ is a maximum value of the optical parameter B among the plurality of embodiments, and $\beta_2$ is a minimum value of the optical parameter B among the plurality of embodiments.

(2) The comparative relation between the optical parameters is that A is greater than B or A is less than B, for example.

(3) The range of a conditional expression covered by a plurality of embodiments is in detail a combination relation or proportional relation obtained by a possible operation of a plurality of optical parameters in each same embodiment. The relation is defined as E, and E is, for example, A+B or A−B or A/B or A*B or $(A*B)^{1/2}$, and E satisfies a conditional expression $E \le \gamma_1$ or $E \ge \gamma_2$ or $\gamma_2 \le E \le \gamma_1$, where each of $\gamma_1$ and $\gamma_2$ is a value obtained by an operation of the optical parameter A and the optical parameter B in a same embodiment, $\gamma_1$ is a maximum value among the plurality of the embodiments, and $\gamma_2$ is a minimum value among the plurality of the embodiments.

The ranges of the aforementioned optical parameters, the aforementioned comparative relations between the optical parameters, and a maximum value, a minimum value, and the numerical range between the maximum value and the minimum value of the aforementioned conditional expressions are all implementable and all belong to the scope disclosed by the invention. The aforementioned description is for exemplary explanation, but the invention is not limited thereto.

In view of unpredictable nature of an optical imaging lens, based on the present invention, when an optical imaging lens meets at least one aforesaid inequality, its the lens elements may have be better assembled, positioned, protected and shaded to reduce the outer diameter of the head portion or promote yield of assembly process to solve the problem of conventional systems.

Additionally, the section headings herein are provided for consistency with the suggestions under 37 C.F.R. § 1.77 or otherwise to provide organizational cues. These headings shall not limit or characterize the invention(s) set out in any claims that may issue from this disclosure. Specifically, a description of a technology in the "Background" is not to be construed as an admission that technology is prior art to any invention(s) in this disclosure. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention (s), and their equivalents, that are protected thereby. In all instances, the scope of such claims shall be considered on their own merits in light of this disclosure, but should not be constrained by the headings herein.

What is claimed is:

1. An optical imaging lens, comprising a plurality of lens elements, positioning from an object side to an image side along an optical axis, each of which comprises an object-side full surface facing the object side and an image-side full surface facing the image side and an optical portion and an mounting portion, formed in a radial direction, from center to edge, the object-side full surface of each of which comprises an objects-side bearing surface corresponding to the mounting portion, and the image-side full surface of each of which comprises an image-side bearing surface corresponding to the mounting portion, and between two of the lens elements, the optical imaging lens comprising:

a light-shielding plate, comprising an object-side surface facing the object side and an image-side surface facing the image side; and two pieces of activated reactive bonding film, being in a shape of ring, one of which is positioned between the object-side surface of the light-shielding plate and the image-side bearing surface of one of the two lens elements, and the other one of which is positioned between the image-side surface of the light-shielding plate and the object-side bearing surface of the other one of the two lens elements, wherein with respect to each of the two pieces of activated reactive bonding film, a maximum width of the piece of activated reactive bonding film in a radial direction is represented by Wdsf, a width of one of the image-side bearing surfaces or the object-side bearing surfaces which bears the light-shielding plate in a radial direction is represented by Lms, a width of the light-shielding plate in a radial direction is represented by Ws, and the optical imaging lens satisfies two inequalities: $0.05\ mm \leq Wdsf-Lms \leq Ws-Lms$ and $0.1\ mm \leq Wdsf \leq 0.7\ mm$.

2. The optical imaging lens according to claim 1, wherein with respect to each of the two pieces of activated reactive bonding film, the optical imaging lens further satisfies two inequalities: $1.8\ \mu m \leq TG \leq 31\ \mu m$ and $TGmax-TGmin \leq 3\ \mu m$, in which TG is a thickness of the piece of activated reactive bonding film, TGmax is a maximum thickness of the piece of activated reactive bonding film, and TGmin is a minimum thickness of the piece of activated reactive bonding film.

3. The optical imaging lens according to claim 2, wherein each of the two pieces of activated reactive bonding film is a piece of pressure sensitive adhesive and the optical imaging lens further satisfies two inequalities: $4\ \mu m \leq TG \leq 31\ \mu m$ and $TGmax-TGmin \leq 2\ \mu m$.

4. The optical imaging lens according to claim 2, wherein one of the two pieces of activated reactive bonding film is a piece of low-temperature activated film, an outer rim of the light-shielding plate is formed with at least three recesses, each of which has a curved edge and two short edges, and the curved edge of which is between the two short edges.

5. The optical imaging lens according to claim 4, wherein the mounting portion of one of the lens elements, adjacent to the piece of low-temperature activated film, is formed with at least three protruding arcs, each of which corresponds to the curved edge and the two short edges of one of the recesses, and the optical imaging lens further satisfies an inequality: $1.2 \leq Has/(TGo+TS/2) \leq 1.8$, in which TGo is a thickness of the piece of low-temperature activated film, and TS is a thickness of the light-shielding plate which is adjacent to the piece of low-temperature activated film.

6. The optical imaging lens according to claim 4, wherein the mounting portion of one of the lens elements, adjacent to the piece of low-temperature activated film, is formed with at least three protruding arcs, n is a number of the protruding arcs, each of the protruding arcs corresponds to the curved edge and the two short edges of one of the recesses, and with respect to each of the protruding arcs, the optical imaging lens further satisfies an inequality: $45.6/(n\alpha)\ mm^2 \leq \pi(ODas^2-IDas^2) \leq 572/(n\alpha)\ mm^2$, in which a is an included angle of the two short sides of the protruding arc of the mounting portion of the lens element, ODas is an outer diameter of the protruding arc of the mounting portion of the lens element, and IDas is an inner diameter of the protruding arc of the mounting portion of the lens element.

7. The optical imaging lens according to claim 1, wherein with respect to each of the activated reactive bonding film, the optical imaging lens further satisfies two inequalities: $0.1\ mm \leq Wdsf-Lms \leq Ws-Lms-0.1\ mm$ and $0.1\ mm \leq Lms \leq 1.2\ mm$.

8. The optical imaging lens according to claim 1, further comprising a base, connecting to an image sensor and satisfying an inequality: $1.9 \leq ODb/ODh \leq 2.4$, in which ODb is a maximum outer diameter of the base, and ODh is a maximum outer diameter of a head portion of the optical imaging lens, in which the head portion is foremost one tenth of the optical imaging lens, starting from the object side.

9. The optical imaging lens according to claim 1, further comprising a base, which is a barrel receiving, in order from the object side to the image side, a front lens element of the lens elements, a spacer and a back lens element of the lens elements, the spacer being positioned between the front lens element and the back lens element, and the optical imaging lens further satisfying two inequalities: $1.9 \leq TBmax/TBmin \leq 4.5$ and $0.2\ mm \leq DOB \leq 1.0\ mm$, in which TBmax is a maximum thickness from the object-side full surface of the front lens element to the image-side full surface of the front lens element along the optical axis, TBmin is a minimum thickness from the object-side full surface of the back lens element to the image-side full surface of the back lens element along the optical axis, and DOB is a maximum distance from the image-side bearing surface of the mounting portion of the front lens element to the objects-side bearing surface of the mounting portion of the back lens element along the optical axis.

10. The optical imaging lens according to claim 9, wherein the lens elements further comprise a first lens element, a second lens element, a third lens element and a fourth lens element, and the optical imaging lens further satisfies an inequality: $1.2 \leq ODm/ODh \leq 1.7$, in which ODm is a minimum outer diameter of a middle section of a sidewall of the optical imaging lens, in which the middle section of the sidewall is an outer sidewall from foremost four tenth to six tenth of the optical imaging lens, starting from the object side, and ODh is a maximum outer diameter of a head portion of the optical imaging lens, in which the head portion is foremost one tenth of the optical imaging lens, starting from the object side.

11. The optical imaging lens according to claim 9, wherein at least one lens element of the lens elements is received in the base, at least one lens element of the lens elements is not received in the base, and the mounting portion of the lens element which is not received in the base is covered by a blackened film, which comprises at least one of the following: a layer of black pigment, a black lamination and a layer of black coating.

* * * * *